Feb. 20, 1968           J. ZEMANEK, JR           3,369,626
METHODS OF AND APPARATUS FOR PRODUCING A VISUAL RECORD
OF PHYSICAL CONDITIONS OF MATERIALS
TRAVERSED BY A BOREHOLE
Filed Oct. 23, 1965           14 Sheets-Sheet 1
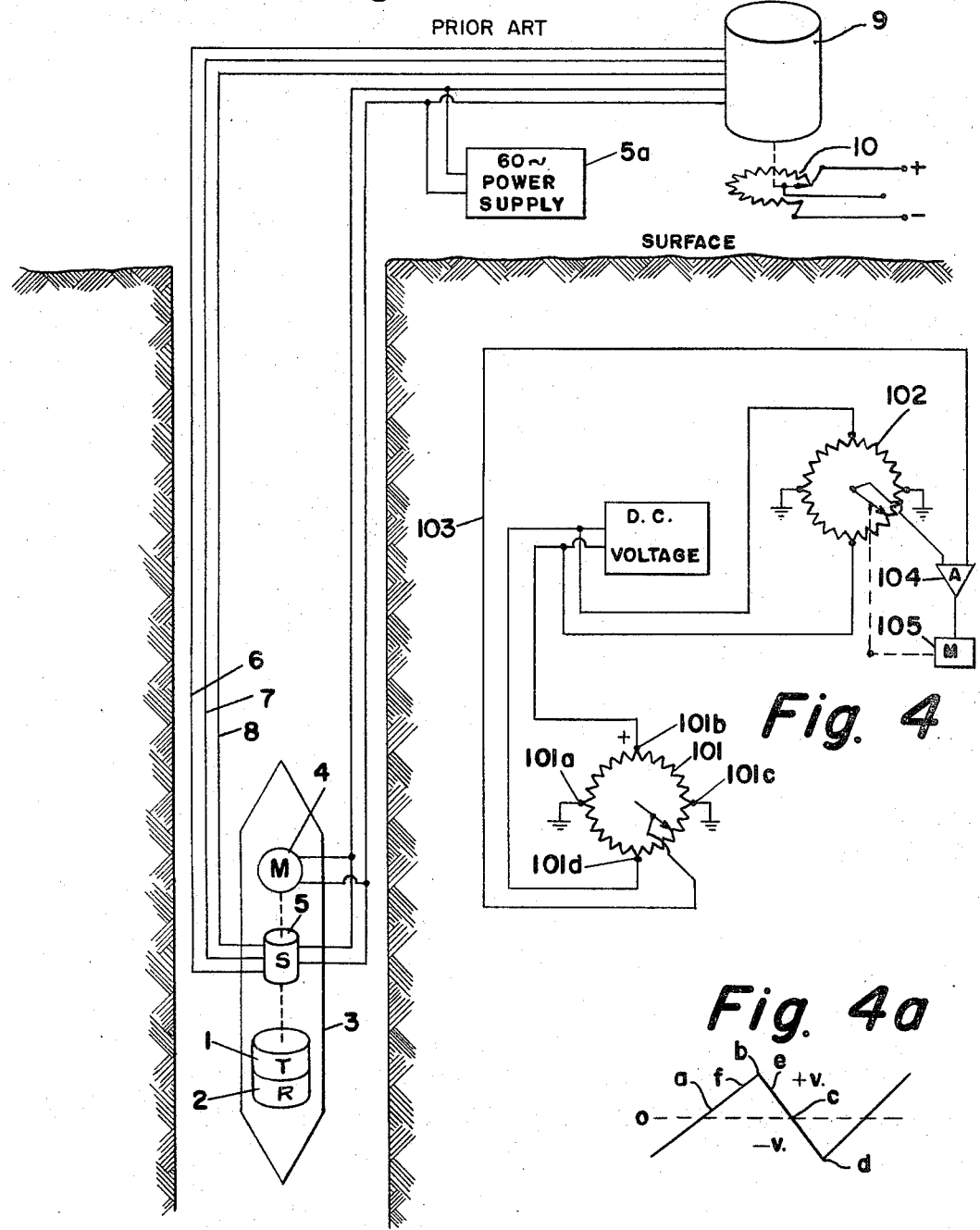
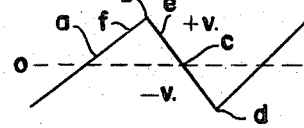

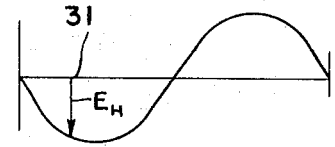
Fig.2a
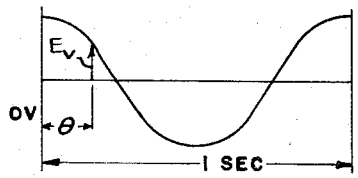
Fig.2b
Fig.2c
Fig.2d
Fig.2e
Fig.2f
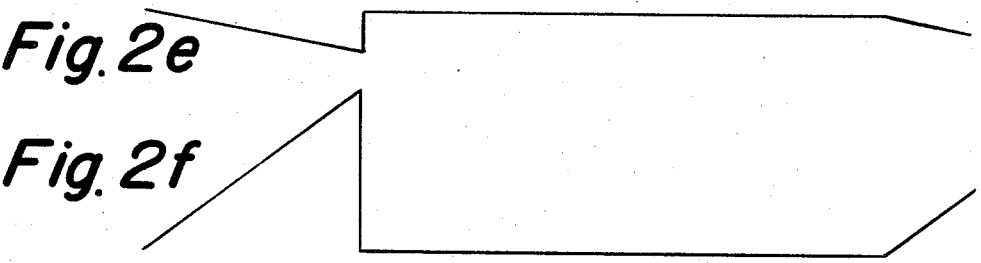
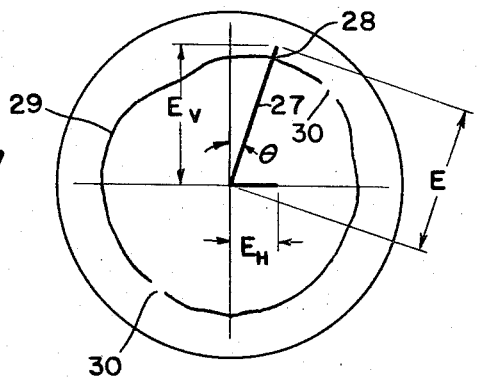
Fig.2g Feb. 20, 1968   J. ZEMANEK. JR   3,369,626
METHODS OF AND APPARATUS FOR PRODUCING A VISUAL RECORD
OF PHYSICAL CONDITIONS OF MATERIALS
TRAVERSED BY A BOREHOLE
Filed Oct. 23, 1965   14 Sheets-Sheet 4
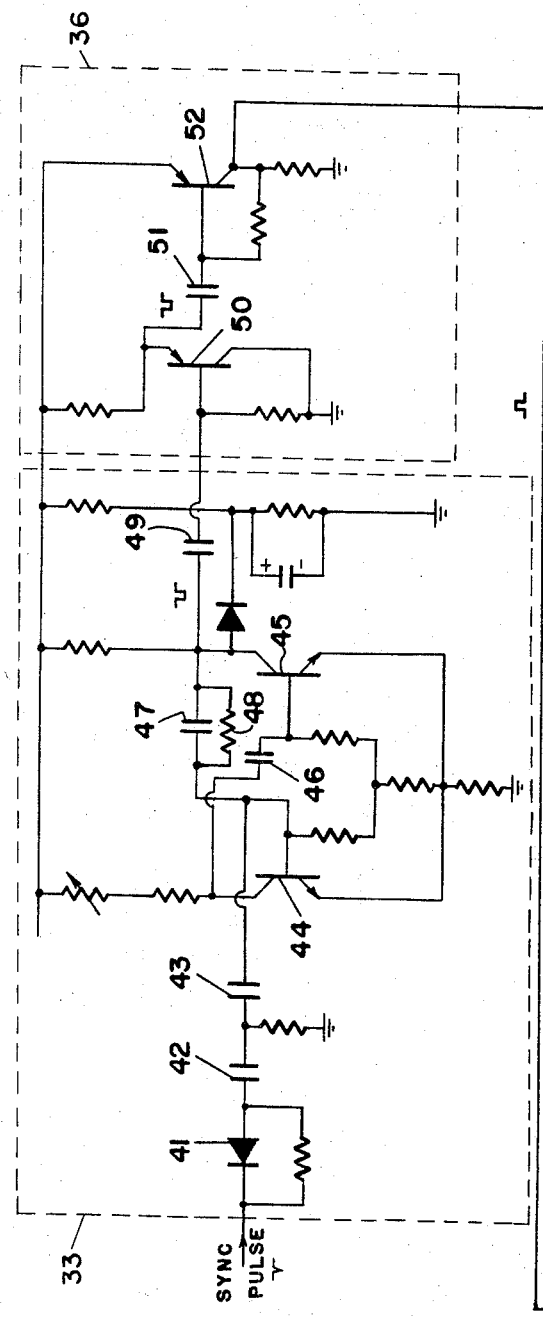
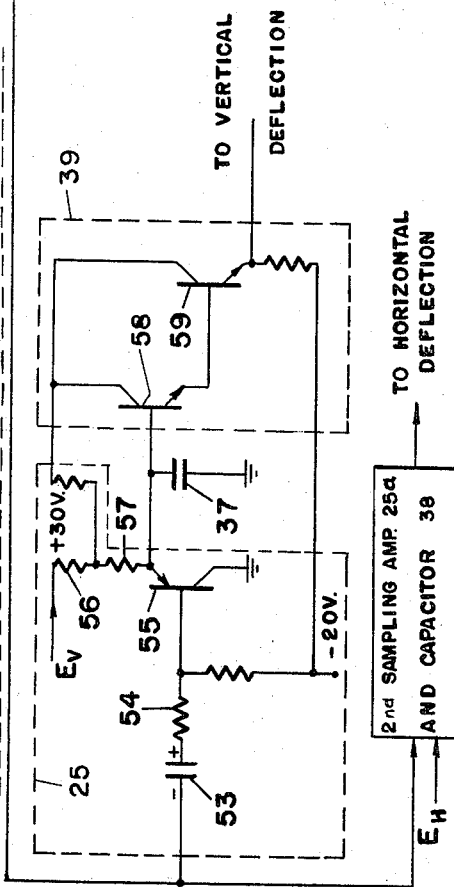
Fig. 3

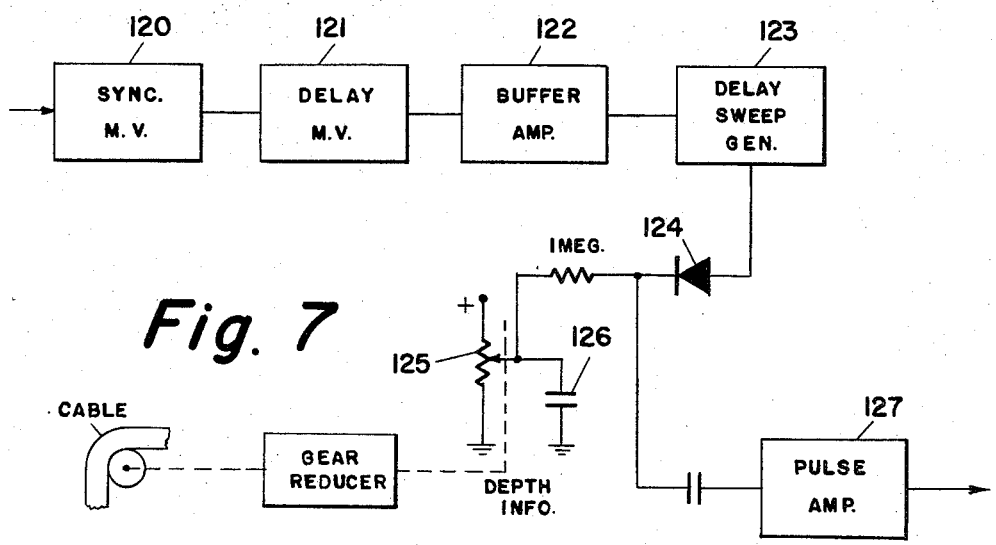
Fig. 7
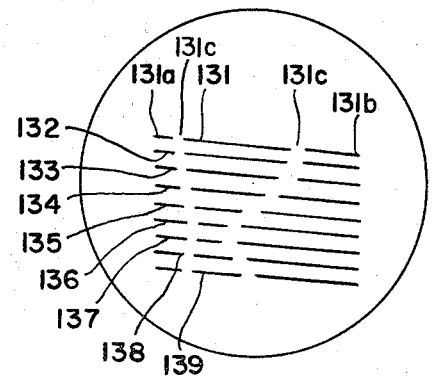
Fig. 8
Fig. 8a

Feb. 20, 1968    J. ZEMANEK, JR    3,369,626
METHODS OF AND APPARATUS FOR PRODUCING A VISUAL RECORD
OF PHYSICAL CONDITIONS OF MATERIALS
TRAVERSED BY A BOREHOLE
Filed Oct. 23, 1965    14 Sheets-Sheet 7
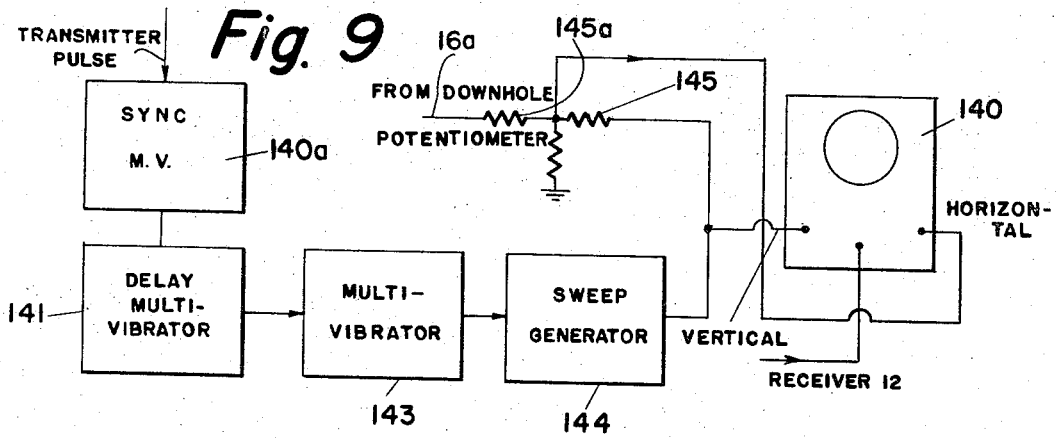
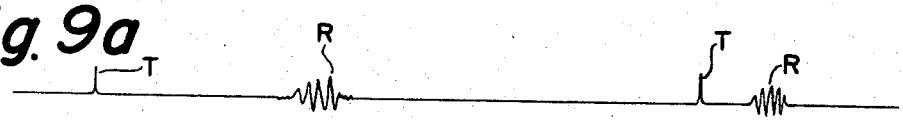
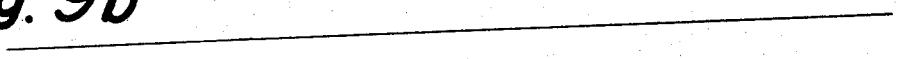
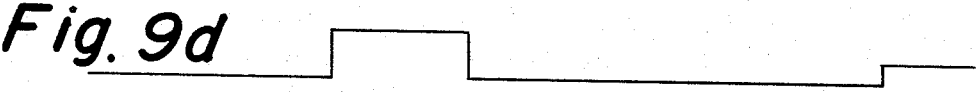
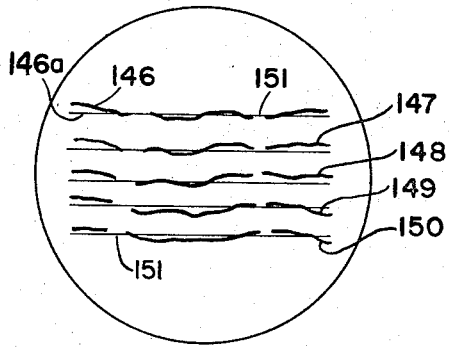

Feb. 20, 1968   J. ZEMANEK, JR   3,369,626
METHODS OF AND APPARATUS FOR PRODUCING A VISUAL RECORD
OF PHYSICAL CONDITIONS OF MATERIALS
TRAVERSED BY A BOREHOLE
Filed Oct. 23, 1965   14 Sheets-Sheet 10

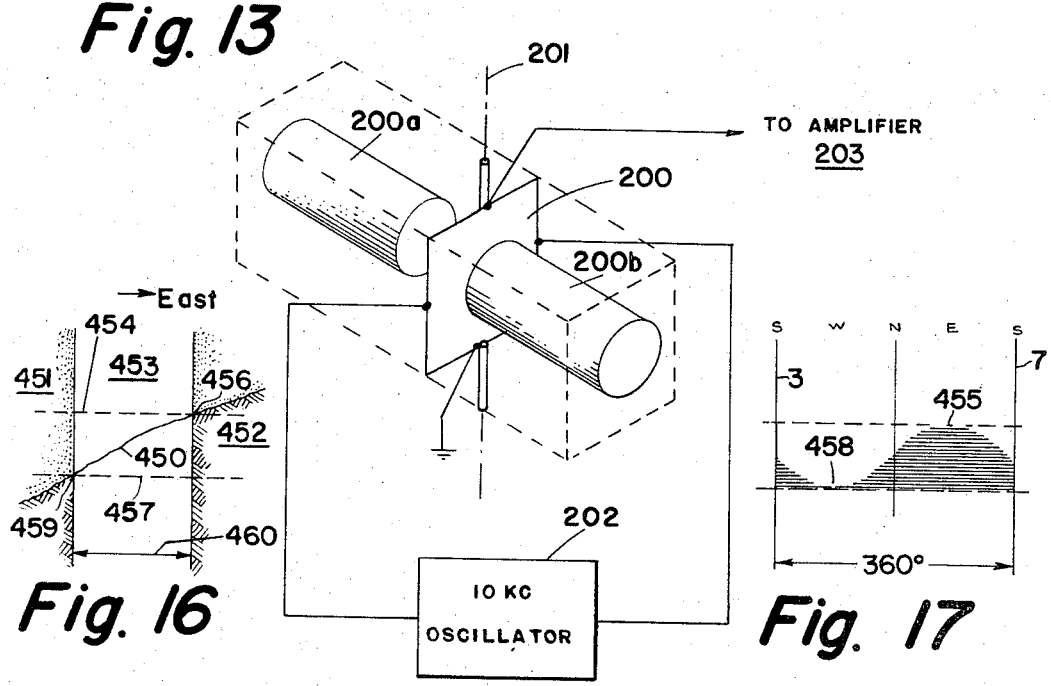

Feb. 20, 1968     J. ZEMANEK, JR     3,369,626
METHODS OF AND APPARATUS FOR PRODUCING A VISUAL RECORD
OF PHYSICAL CONDITIONS OF MATERIALS
TRAVERSED BY A BOREHOLE

Filed Oct. 23, 1965     14 Sheets-Sheet 14

United States Patent Office 3,369,626
Patented Feb. 20, 1968

3,369,626
METHODS OF AND APPARATUS FOR PRODUCING A VISUAL RECORD OF PHYSICAL CONDITIONS OF MATERIALS TRAVERSED BY A BOREHOLE
Joseph Zemanek, Jr., Dallas, Tex., assignor to Mobil Oil Corporation, a corporation of New York
Continuation-in-part of application Ser. No. 391,151, Aug. 21, 1964. This application Oct. 23, 1965, Ser. No. 507,630
36 Claims. (Cl. 181—.5)

ABSTRACT OF THE DISCLOSURE

The specification discloses an acoustic logging system for producing visual records of the physical conditions of wall structure traversed by a borehole. A beam of pulsed acoustic, high-frequency energy is swept across the face of the wall structure through 360°. Reflected energy is detected and sent uphole to the cathode ray oscilloscope. The sweep of the cathode ray beam is initiated by a geographical sensing device in the downhole tool so as to correlate the rotational position of the beam with the received data. The cathode ray beam is moved as a function of depth relative to a recording medium to produce a picture of the wall structure.

---

Figure 2:
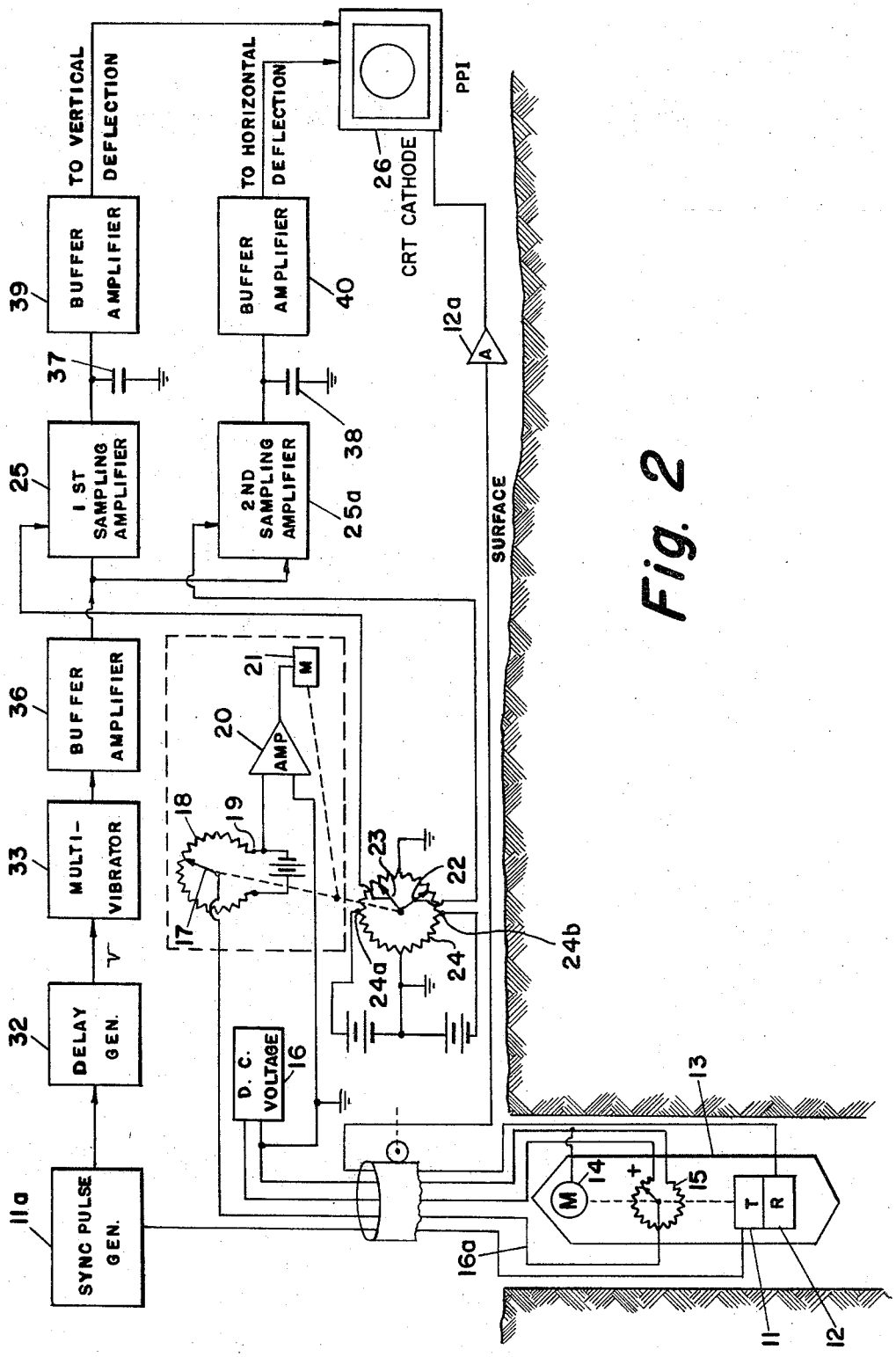

This application is a continuation-in-part of application Serial No. 391,151, filed Aug. 21, 1964, now abandoned.

This invention relates to methods of and apparatus for examining boreholes and formations adjacent boreholes and, more particularly, relates to an improved system including a source of pulsed energy, a receiver for detecting the reflections of said pulsed energy, and a display device for converting the received pulses into a representation of the configuration of the borehole or of lithology of adjacent formations and of any anomalies therein.

It is frequently necessary to measure the diameter, or cross-sectional area, of a borehole which may extend to great depth. In addition to determining the actual configuration of the borehole, it is desirable to determine anomalies which may exist at different depths in the borehole. For example, these anomalies may be a fault or crack in the borehole, a fracture in formations traversed by the borehole, or the presence of an obstruction in the borehole. In other situations, it is desirable to determine the existence of faults, or other characteristics, in the adjacent formations spaced from the borehole.

One type of borehole logging system useful for making such determinations includes a transmitter of pulsed energy which, for example, may be a transmitter of supersonic pulses. This transmitter and a receiver adapted to detect the energy pulses after reflection from the walls of the borehole are included in an assembly which is moved through the borehole. Concurrent with the movement through the borehole, the assembly is rotated about the borehole axis so that the reflected energy signals are indicative of the configuration and anomalies of the borehole at different angular positions. The detected signals are converted to a presentation which displays either the configuration or the anomalies in formations traversed by the borehole, or both. Or, the detected signals are recorded for subsequent use.

In accordance with one aspect of this invention, there is provided a technique for most usefully presenting the signals representing the configuration and anomalies of the formations surrounding the borehole as determined by the reflected energy pulses. (As used herein, the formations surrounding the borehole includes the borehole casing as well as the adjacent geophysical formations.) As examples, there is produced a display having three dimension effect which represents the configuration and anomalies of the borehole over a segment of some depth. Other displays representing only the anomalies in the borehole and some representing both the anomalies and the configuration, or diameter, of the borehole are provided in accordance with this invention.

In addition to conducting the reflected energy signals to the indicating device, which is generally located uphole, there must additionally be provided means for conducting to the uphole location signals indicative of the angular position of the tool. By applying both the signals indicative of the angular position and the reflected energy signals to the indicating device, a display can be produced which represents quite accurately the configuration of the borehole at a particular depth.

In the prior art, a synchro system has commonly been provided for indicating the angular position of the transmitter-receiver assembly. As the assembly is rotated by a motor, a synchro-transmitter is also rotated. At the uphole location, a synchro-receiver is provided and both the synchro-transmitter and the synchro-receiver are energized from a source of AC power. Three signal leads connect the downhole synchro-transmitter with the uphole synchro-receiver and these three connections carry signals which act to drive the synchro-receiver to the same angular position as that assumed by the synchro-transmitter. Such a system has disadvantages under certain conditions. First, three signal leads are required to connect the synchro-transmitter with the synchro-receiver. Where the tool is to be lowered to great depth in the borehole, the provision of all of these conductors extending from the uphole location to the downhole tool presents difficulties. Furthermore, the requirement that the downhole synchro-transmitter be supplied with AC power introduces problems of cross-feed of the AC to other signal-carrying conductors which extend to the downhole tool.

In accordance with another aspect of this invention, the above-mentioned problems of synchro systems are obviated by utilizing a potentiometer as a downhole angular position indicating device. The movable contact of the potentiometer is driven concurrently with the rotation of the transmitter-receiver assembly. The voltage on this movable contact is applied to a single conductor which extends to the uphole location and the voltage on this conductor is indicative of the angular position of the transmitter-receiver assembly. At the uphole location, this voltage is applied to a self-balancing servo system which drives the movable contact of an uphole potentiometer to a position which corresponds with the angular position of the downhole transmitter-receiver assembly. This uphole potentiometer can be used to produce horizontal and vertical deflection voltages which are applied to an indicating device of the electron beam type so that the electron beam traces out paths on the face of the indicating device corresponding with different angular positions of the borehole.

In accordance with other aspects of this invention, there are provided improved potentiometer circuits and self-balancing circuits which are not susceptible to dead spots or ambiguous changes in the direction of rotation of the indicating potentiometer.

In accordance with another aspect of this invention, the foregoing is accomplished by providing an uphole potentiometer having two movable contacts and which is wound so that the voltages developed at the two contacts vary in a sinusoidal manner. Further, the contacts are positioned 90° apart so that the sinusoidal voltage developed on one contact lags the voltage on the other contact by 90°. The voltages on these two movable contacts are converted to horizontal and vertical deflection voltages for the indicating device by means of two sampling circuits which periodically apply the sinusoidal voltages to two capacitors. When the voltage is applied to these capacitors, the voltage across the capacitors rises linearly toward the sampled voltage. Such a system has the advantage that it is not necessary to apply a changing sweep voltage directly to the potentiometer as was the case with many prior art systems of this type. This prior art arrangement is quite unsatisfactory, particularly where a short sweep is desired, for the reason that all potentiometers have a certain capacitance and this capacitance distorts the waveform of the applied sweep voltages.

In accordance with another aspect of this invention, there is provided a technique for utilizing an acoustic logging tool to determine the nature and character of subsurface formations and the presence of anomalies therein and there is provided a technique wherein the acoustic logging tool may be utilized to determine the dip, or slope, of subsurface formations which are traversed by a borehole.

In accordance with another aspect of this invention, there is provided a borehole logging system for probing formations defining a borehole with a beam of high frequency energy and including means for receiving energy reflected from said formations, and means for displaying the received energy on a recording medium in correlation with change in depth of said logging system in said borehole so that there is registered on said recording medium a representation of the characteristics of said formations at different depths.

In accordance with another aspect of this invention, there is provided an uphole sweep generator which generates a sweep voltage free of undesirable ripple to produce a more accurate display on the uphole display medium.

In accordance with another aspect of this invention, the sweep voltage for the display medium is initiated by a signal from a magnetic field sensitive device in the downhole tool so that the beginning of the sweep corresponds with the orientation of the rotating beam of high frequency energy in a particular geographic direction.

In accordance with a still further aspect of this invention, there is provided a circuit for detecting the high frequency receiver signal to convert it to a signal of lower frequency for intensity modulation of the display device.

In accordance with a still further aspect of this invention, there is provided an automatic gain control circuit for providing a constant intensity of modulation of the electron beam by the receiver signal when the logging tool is being used to detect faults or cracks in the borehole wall.

Figure 5:
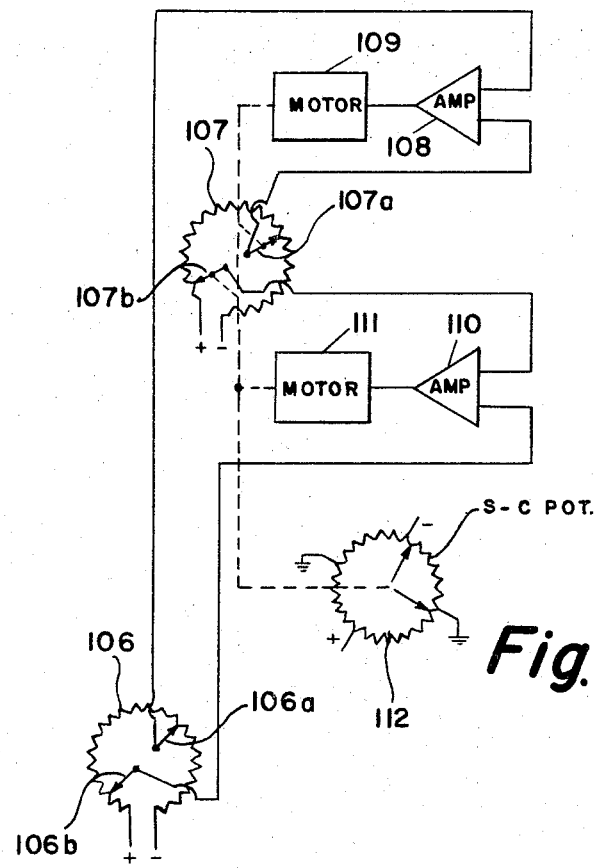
Figure 6:
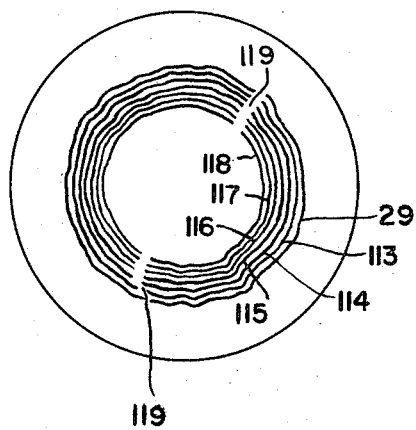
Figure 6A:
Figure 6B:
Figure 6C:
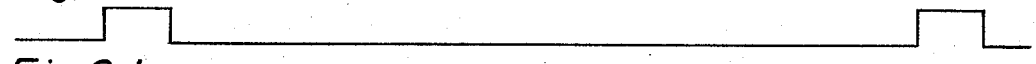
Figure 6D:
Figure 6E:
Figure 10:
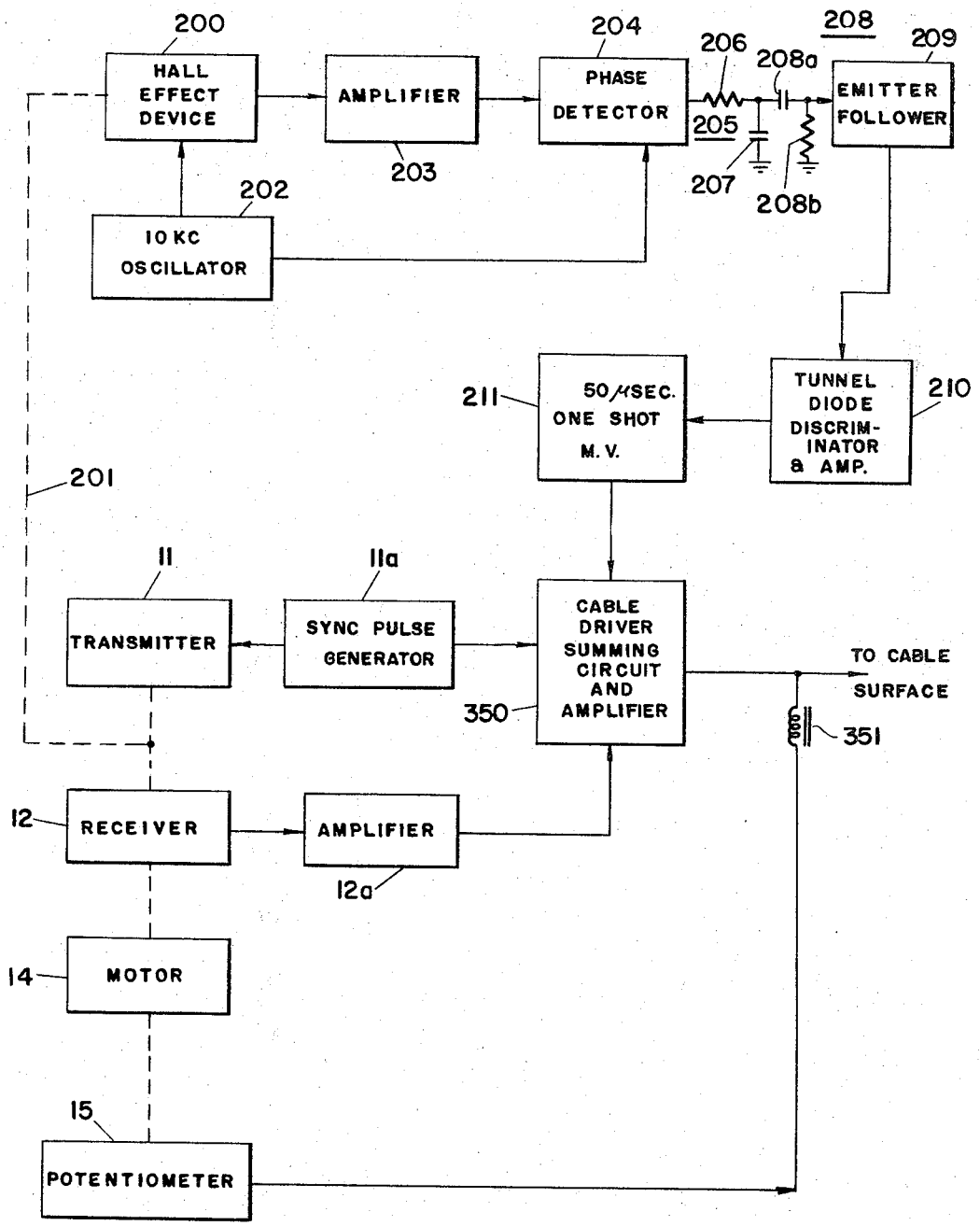
Figure 11A:
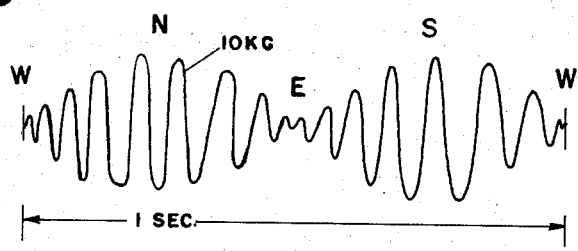
Figure 11B:
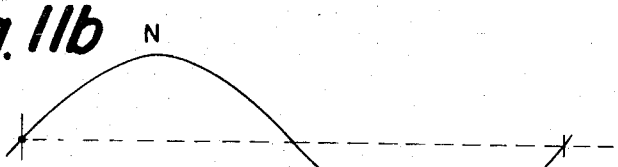
Figure 11C:
Figure 18:
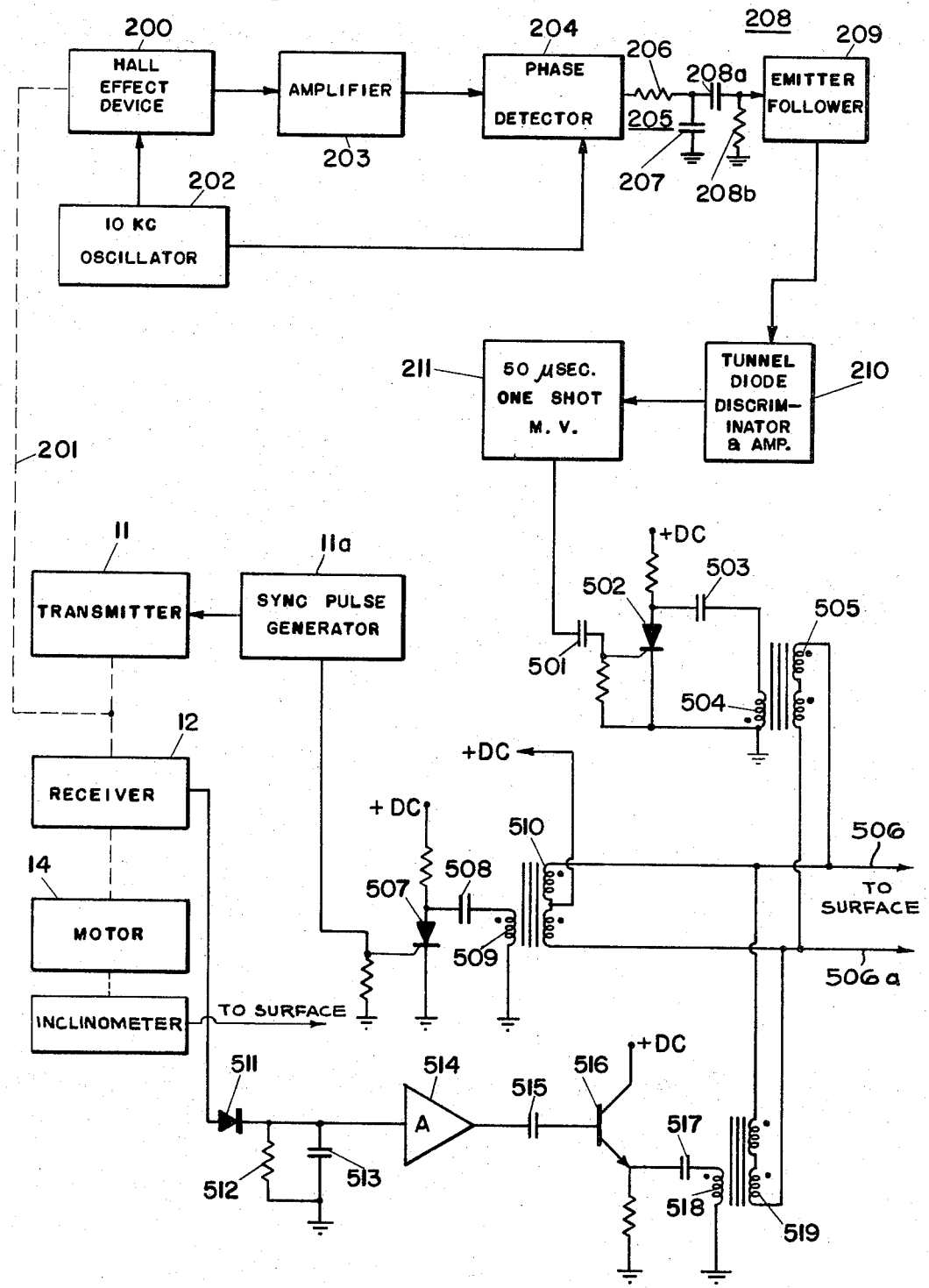
Figure 19:
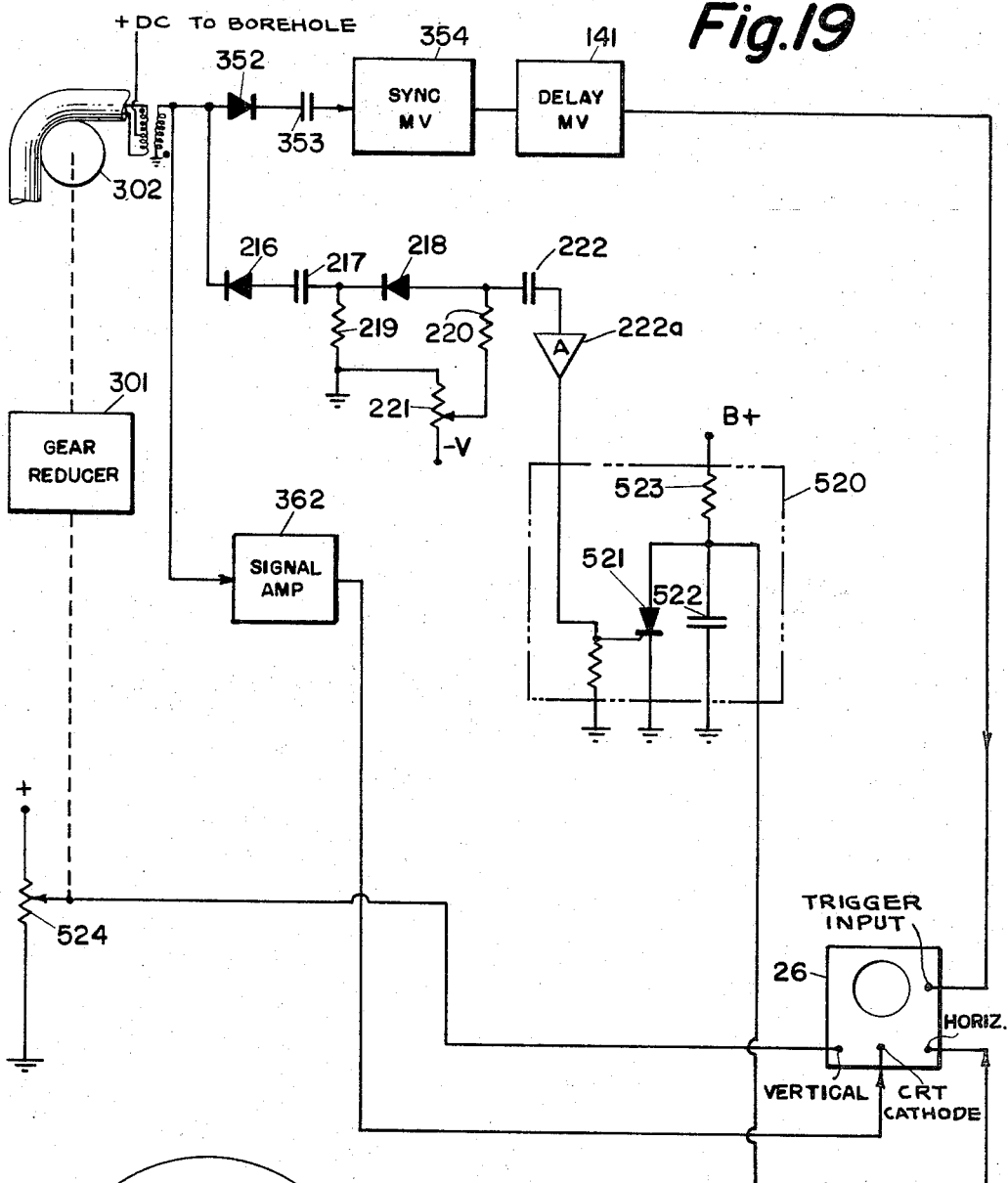
Figure 20:
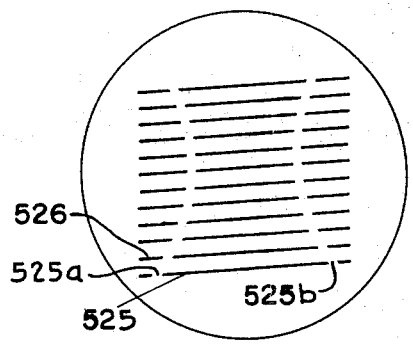
Figure 17A:
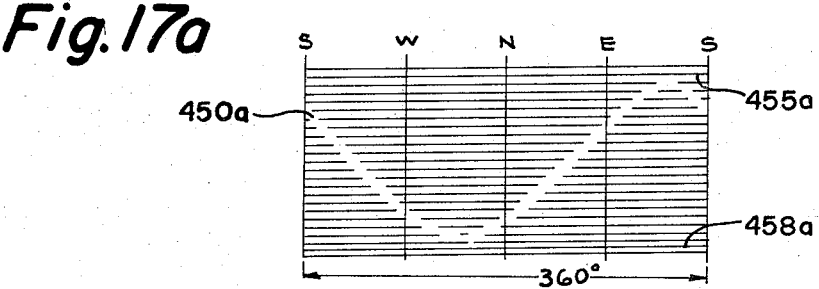
Figure 21:
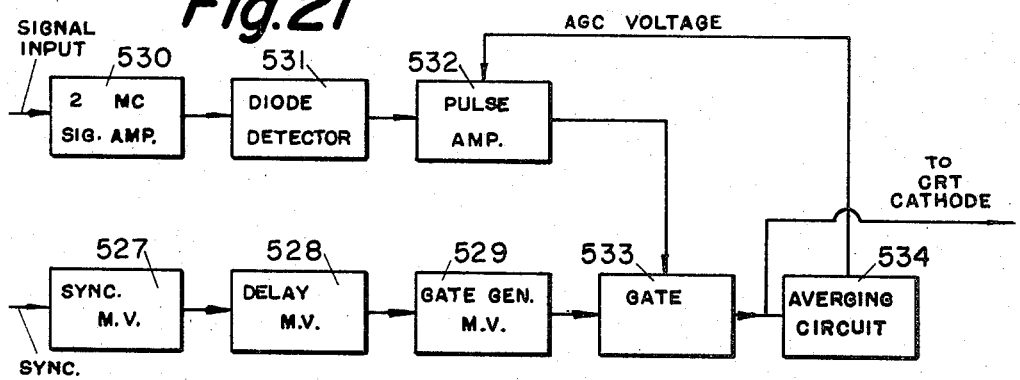
Figure 22:
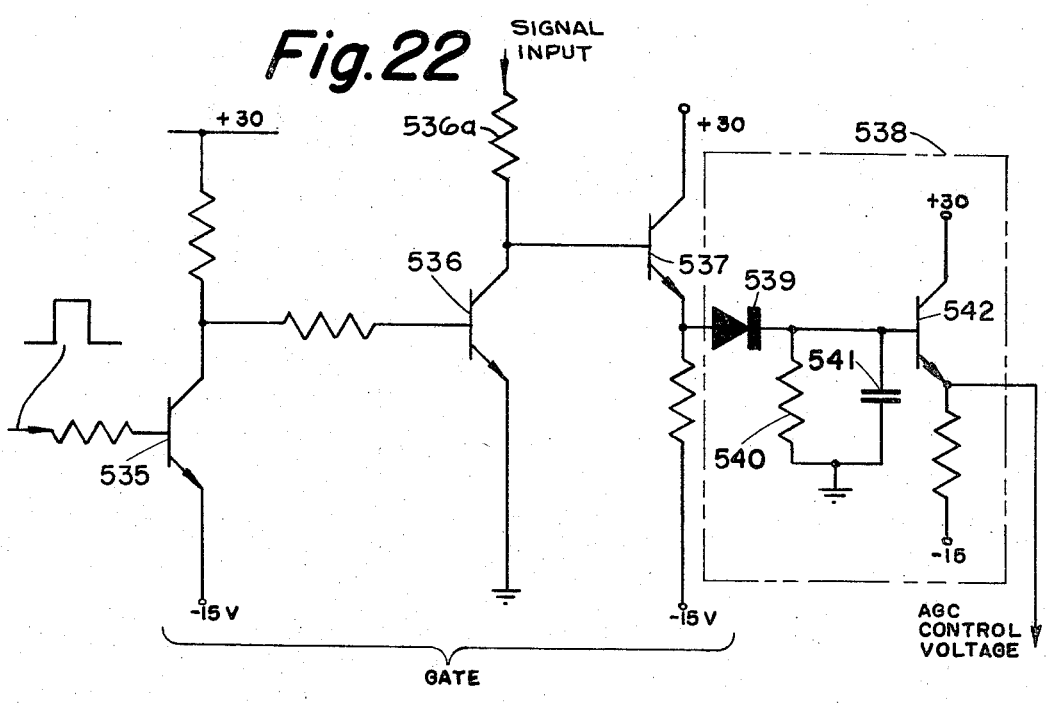

The foregoing and other objects, features and advantages of the invention will be better understood from the following more detailed description and appended claims in conjunction with the drawings in which:

FIG. 1 shows a sonic borehole calipering system;
FIG. 2 shows a borehole calipering system in accordance with the present invention;
FIGS. 2a and 2b show the two outputs of the sine-cosine potentiometer;
FIGS. 2c–2f are waveforms depicting the operation of the system of FIG. 2;
FIG. 2g is a representation of the face of the display device;
FIG. 3 shows the circuitry for producing the deflection voltages;
FIG. 4 shows a modification of the potentiometer and self-balancing system;
FIG. 4a is a waveform of the voltage produced on the movable contact of the downhole potentiometer;
FIG. 5 shows another modification of the potentiometer and self-balancing system;
FIG. 6 shows a display produced in accordance with one modification of the invention;
FIGS. 6a–6e are waveforms depicting the operation of the modification used to obtain the display of FIG. 6;
FIG. 7 shows the circuitry used in obtaining the display of FIG. 6;
FIG. 8 shows a display obtained in accordance with another modification of the invention;
FIG. 8a shows a waveform of the horizontal deflection voltage of a modification of the invention;
FIG. 9 shows another modification of the circuitry used to obtain a display;
FIGS. 9a–9e are waveforms depicting the operation of the modification of the circuitry used to obtain the display of FIG. 9;
FIG. 9f is the display obtained in accordance with the modification of FIG. 9;
FIG. 10 shows downhole circuitry for producing an indication of angular position of the transmitter-receiver assembly;
FIGS. 11a–11f are waveforms depicting the operation of the angular position indicating circuitry;
FIG. 12 shows the uphole circuitry used to indicate angular position and depth of the logging tool;
FIG. 13 shows in more detail the Hall effect device for indicating angular position;
FIG. 14 shows the circuit details of the tunnel diode detector;
FIG. 15 shows the circuit details of the gates of FIG. 12;
FIG. 16 shows a borehole traversing a dipping formation;
FIG. 17 shows a display indicating the dip of formations traversed by a borehole;
FIG. 17a shows a display indicating the dip of a fault traversed by a borehole;
FIG. 18 shows another embodiment of the downhole tool forming this invention;
FIG. 19 shows the uphole circuitry to be used with the downhole tool of FIG. 18;
FIG. 20 shows a display produced by the embodiment of FIGS. 18 and 19;
FIG. 21 is a block diagram of automatic gain control circuitry; and
FIG. 22 is a circuit diagram of the automatic gain control.

Referring now to FIG. 1, there is shown a common arrangement for rotating a sonic transmitter and receiver in a borehole. As is normal in acoustic logging systems, a transmitter 1 and a receiver 2 are enclosed in a logging tool 3 which is lowered into the borehole. The transmitter 1 and receiver 2 are rotatably mounted so that they can be continuously rotated by the motor 4. In order to transmit a signal uphole, which is indicative of the angular position of the transmitter 1 and receiver 2, a synchro transmitter 5 is provided. The motor 4 and the synchro transmitter 5 are supplied with AC power from the power supply 5a located uphole.

As is well known in the synchro system art, the synchro transmitter 5 provides signals on the leads 6, 7 and 8 which are indicative of the angular position of the synchro transmitter 5. These signals are applied to a synchro receiver 9 located uphole. The same AC voltages from power supply 5a are also applied to the synchro receiver 9. The signal leads 6, 7 and 8 drive the synchro receiver 9 to the same angular position to which the synchro transmitter 5 has been driven. Therefore, the synchro receiver 9 is in an angular position which matches the angular position of the synchro transmitter 5. In order to convert this position to a voltage indicative of the angular position, a potentiometer 10 is provided.

The system just described has the disadvantage that three leads 6, 7 and 8 for the synchro system, plus two leads for the AC power supply must be provided between the uphole location and the downhole logging tool. The system shown in FIG. 1 also has the disadvantage that the AC power voltage results in cross-feed to the transmitter and receiver signals on the other cables going uphole.

Both of the foregoing disadvantages are obviated in accordance with one aspect of my invention by providing a system such as is shown in FIG. 2. In FIG. 2, instead of providing a synchro system for indicating the angular position of the downhole transmitter and receiver, there has been provided an arrangement by which a varying DC voltage on a single line indicates the angular position. Also, only two DC power voltage leads are connected to the downhole logging tool. By doing this, the total number of leads required to supply energizing power and to indicate the position of the downhole tool has been reduced from five, in the case of the synchro system, to three in the system shown in FIG. 2. In addition, since no AC power is required in the downhole tool, there is less cross-feed and the resultant operation is very much improved.

A transmitter 11 and a receiver 12 are rotatably mounted in the logging tool 13. While a separate transmitter and receiver have been shown, it will be appreciated that a single transducer, commonly referred to as a transceiver, could be used to perform both functions. The transmitter 11 and receiver 12 are continuously rotated by the motor 14. The transmitter 11 is periodically pulsed by the sync pulse generator 11a. It will be understood, of course, that the transmitter may be energized in any repetitive manner which need not necessarily be periodic in time. When the transmitter 11 produces a pulse of acoustic energy, this pulse travels to the periphery of the borehole and is returned as an echo to the receiver 12. The receiver 12 produces a pulse which occurs at a time after the transmitter pulse which is indicative of the distance from the center of the borehole to the periphery of the borehole from which the echo was received. The receiver pulse from receiver 12 is applied to an amplifier 12a. In FIG. 2, the sync pulse generator 11a and the amplifier 12a have been shown at an uphole location for convenience of drawing. However, normally, sync pulse generator 11a and amplifier 12a will be contained in the downhole logging tool 13. The output of amplifier 12a is used to turn on the beam of a plan position indicator 26. The output of amplifier 12a is applied to the CRT cathode input of the oscilloscope to modulate the intensity of the beam in accordance with the received signal. As the transmitter 11 and receiver 12 rotate in the borehole, the transmitter 11 is continuously pulsed thereby providing at receiver 12 a return from each section of the periphery of the borehole. When the transmitter 11 and receiver 12 have been rotated a full 360°, there have been produced signals at the receiver 12 which are indicative of the size of the borehole and also indicative of any faults or breaks in the wall of the borehole.

As the assembly, including transmitter 11 and receiver 12 rotates, the movable contact of the potentiometer 15 also rotates. A DC voltage from the DC voltage supply 16 is connected across the potentiometer 15. As the movable contact of potentiometer 15 rotates, a slowly varying DC voltage is produced on the lead 16a. This varying DC voltage is applied to the movable contact 17 of the balancing potentiometer 18 located uphole. Potentiometer 18 is connected in a balancing system such that the position of movable contact 17 will always exactly match the position of the movable contact of the potentiometer 15 located downhole. This balancing system works as follows: As the voltage on the movable contact 17 changes, the voltage at the point 19 changes. This changing voltage at the point 19 is connected to an amplifier 20 which drives the balancing motor 21. The balancing motor 21 in turn drives the movable contact 17 in a direction which reduces the voltage at the point 19 to zero. In this manner, the movable contact 17 is driven to a position which matches the position of the movable contact of the potentiometer 15.

The motor 21 concurrently drives the movable arms 22 and 23 of the sine-cosine potentiometer 24. This potentiometer is of the type which produces a voltage which varies sinusoidally as the movable contact rotates. Such potentiometers are readily available. For example, Helipot model No. 5713 R20k C.5 (sine-cosine) can be used for this purpose. The voltage produced at the movable contact 22 is a sinusoidal voltage such as that shown in FIG. 2a. The voltage produced at the movable contact 23 is a cosine voltage such as that shown in FIG. 2b. The movable contacts 22 and 23 are 90° apart so that the voltage produced on movable contact 22 lags the voltage produced on movable contact 23 by 90°. The voltages on the movable contacts 22 and 23 are indicative of the angular position of the downhole transmitter 11 and receiver 12.

In order to convert the sine and cosine voltages to deflection voltages which may be used to drive the deflection plates of a plan position indicator 26 (PPI), the sinusoidal voltage on the movable contact 22 is applied to a second sampling amplifier 25a and the cosine voltage on the movable contact is applied to a first sampling amplifier 25.

Before proceeding with the description of the circuitry of FIG. 2 which converts the sine and cosine voltages to horizontal and vertical deflection voltages for the plan position indicator 26, it is desirable to examine the nature of the voltages which must be applied to the horizontal and vertical deflection plates of the plan position indicator 26.

Referring to FIG. 2g, there is shown the face of the plan position indicator in more detail. Each time the transmitter 11 is fired, an electron beam sweeps outwardly from the center of the indicator toward the periphery. Such a sweep may follow the path 27. When the echo of the transmitter pulse is received at receiver 12, receiver 12 produces a signal which turns on the beam at the point 28 to indicate the periphery of the borehole at the point 28. As the transmitter 11 is rotated in the borehole, it is successively fired.

As the transmitter is fired at different angular positions, the plan position indicator 26 traces out successive sweeps starting from the center and extending toward the periphery of the indicator. Each successive sweep must be at a different angular position. During these successive sweeps at different angular positions, the electron beam will be turned on at positions indicative of the distance from the center of the borehole to the periphery of the casing at the successive angular positions. In this manner, there will be traced out on the plan position indicator a visible trace 29 indicative of the shape of the borehole at that depth. Further, if there is an anomaly such as a fault or crack in the borehole at that depth, the electron beam will not be turned on during that sweep. This is indicated by the discontinuities 30 in the trace. Therefore, it would be quite easy to determine the location of the fault in the borehole at that depth from the visible trace on the plan position indicator.

Returning to the voltages necessary to generate successive sweeps of the electron beam on the plan position indicator 26, refer again to the sweep 27 made by the electron beam. In order to sweep the electron beam along the path 27, it is necessary to apply a voltage to the horizontal deflection plate which starts at zero and increases linearly toward a voltage proportional to the distance $E_H$ on FIG. 2g. Similarly, a voltage must be applied to the vertical deflection plates which starts at zero and increases linearly to a voltage proportional to $E_V$. The voltages proportional to $E_V$ and $E_H$, which voltages will subsequently be referred to as $E_V$ and $E_H$, are provided by the sine-cosine voltages from the movable contacts 22 and 23. For example, referring to FIGS. 2a and 2b, assume that the transmitter has been fired at a time 31 which may be expressed by the angular coordinate $\theta$. At that time the voltage on movable contact 22 is equal to the voltage $E_H$, and the voltage on movable contact 23 is equal to $E_V$. These voltages are sampled at the time 31 and there is produced the horizontal and vertical deflection voltages which increase linearly toward $E_H$ and $E_V$ as just described. In this manner, the electron beam is caused to move along the path 27 on the face of the indicator 26.

When the transmitter 11 is fired by the sync pulse generator 11a, there is coincidentally produced a sync pulse which is applied to delay generator 32. The function of delay generator 32 in producing a different display will subsequently be explained. The sync pulse passes through delay generator 32 to trigger the monostable multivibrator 33. The monostable multivibrator 33 produces a positive-going step voltage as shown in FIG. 2d. The step voltage goes positive at the time 34 which is coincident with the occurrence of the transmitter pulse T shown in FIG. 2c. The output of monostable multivibrator 33 remains up until the time 35, at which it returns to its more negative position. The interval of time between 34 and 35 is chosen to be sufficient to allow the return of the receiver pulse R during this interval. Commonly, the time interval may be chosen to be 100 microseconds in a system in which the interval between transmitter pulses is 1000 microseconds.

The step voltage output of multivibrator 33 is applied through buffer amplifier 36 to the sampling amplifiers 25a and 25. When the step voltage goes up, as at 34, the voltage $E_V$ from movable contact 23 is sampled. This voltage is applied through the sampling amplifier 25 to the capacitor 37. As a result, the voltage across capacitor 37 rises linearly toward the voltage $E_V$; the voltage across capacitor 37 is shown in FIG. 2f. Similarly, when the step function of FIG. 2d goes positive, the voltage $E_H$ from movable contact 22 is applied through sampling amplifier 25a to the capacitor 38. As a result, the voltage across capacitor 38, as shown in FIG. 2e, increases linearly toward $E_H$ in a negative direction.

The voltage across capacitor 37, shown in FIG. 2f, is applied through buffer amplifier 39 to the vertical deflection plates of the plan position indicator 26. Similarly, the voltage across capacitor 38, shown in FIG. 2e, is applied through buffer amplifier 40 to the horizontal deflection plates. As a result of the application of the voltages of FIGS. 2e and 2f to the horizontal and vertical deflection plates of the plan position indicator, the electron beam of the plan position indicator will trace out a sweep along the path 27.

When the receiver 12 receives the echo from the transmitter pulse, the waveform of the received pulse is indicated at R in FIG. 2c. This pulse is applied through amplifier 12a to the CRT cathode of the plan position indicator 26 to turn on the beam so that on its face will appear a spot as at 28, FIG. 2g.

As the transmitter 11 and receiver 12 are rotated in the borehole, successive transmitter pulses initiate successive sweeps on the plan position indicator 26 at increasing values of $\theta$. On each sweep the beam is turned on when the receiver 12 receives the reflection of the transmitter pulse. This causes the beam to register on the display medium of the plan position indicator 26. The result is that a visible trace 29 is registered on the face of the plan position indicator 26, FIG. 2g, thereby indicating the diameter of the borehole at that particular depth. Furthermore, the trace has discontinuities caused by the absence of reflections. These discontinuities are indicative of borehole anomalies.

There can now be appreciated a further aspect of this invention. The provision of the sampling amplifiers 25a and 25 and capacitors 37 and 38 for developing the vertical and horizontal deflection voltages represents a great improvement over prior art techniques for developing the deflection voltages. In the prior art where provision has been made for a potentiometer, such as potentiometer 24, to rotate in synchronism with the rotation of the downhole tool, the vertical and horizontal deflection voltages were developed directly from the potentiometer by applying a sawtooth waveform directly to the potentiometer. By applying a sawtooth voltage, for example, across the points 24a and 24b of the potentiometer, there is developed directly across the movable contacts 22 and 23 vertical and horizontal sweep voltages which vary in accordance with the angular position of the downhole tool. However, where a very small diameter bore is being calipered, it is necessary that the sawtooth waveform have a period on the order of 100 microseconds. It is not feasible to apply a sawtooth waveform having this small a period, or this high a frequency, to a potentiometer without undue distortion of the waveform. Since potentiometers inherently have a certain capacitance, this capacitance distorts high frequency sawtooth waveforms.

The circuitry making up the buffer amplifier 36, sampling amplifiers 25a and 25, capacitors 37 and 38, and buffer amplifiers 39 and 40 will now be described in detail. Referring to FIG. 3, a negative sync pulse from delay generator 32, FIG. 2, is applied through input diode 41 and capacitors 42 and 43 to the base of transistor 44 which together with transistor 45 forms the multivibrator 33 shown in FIG. 2. The transistor 44 is normally conducting but when the negative sync pulse is applied to the base thereof, the transistor is rendered non-conducting. As a result, the collector of transistor 44 goes positive and this positive-going voltage is coupled through capacitor 46 to render the normally non-conductive transistor 45 conductive. When the transistor 45 is rendered conductive, the collector of transistor 45 goes negative. The time during which the transistor 45 remains in the conductive state is determined by the time constant of the coupling circuit formed by the capacitor 47 and resistor 48 connected between the collector of transistor 45 and the base of transistor 44. When the transistor 45 returns to its non-conductive condition, the voltage at the collector thereof goes positive.

The negative-going step voltage formed at the collector of transistor 45 as a result of the monostable multivibrator action is coupled through capacitor 49 to the base of transistor 50 which is connected as an emitter follower. The emitter follower. The emitter of transistor 50 is coupled through capacitor 51 to the base of transistor 52. Transistors 50 and 52 in FIG. 3 form the buffer amplifier 36 in FIG. 2.

The waveform produced at the collector of transistor 52 is a positive-going step voltage which is applied to the sampling amplifiers. This positive step voltage is applied through capacitor 53 and resistor 54 to the base of the normally conducting transistor 55. Transistor 55 normally provides a conductive path to ground across the capacitor 37. However, when the step voltage at the base of transistor 55 goes positive, the transistor 55 is cut off. At this time, the voltage $E_V$ from movable contact 23, is applied through resistors 56 and 57 to capacitor 37. The voltage across capacitor 37 begins to rise toward the voltage $E_V$. The linear voltage across capacitor 37 is applied to the input of buffer amplifier 39 by way of the base of transistor 58 which together with transistor 59 form what is commonly referred to as a Darlington emitter follower circuit. The vertical deflection voltage is developed at the emitter of the transistor 59.

In a similar manner the positive-going step voltage is applied to similar circuitry to develop the horizontal deflection voltage.

There will now be described several modifications which may be made both in the manner of generating the signals indicative of the angular position of the downhole instrument and in the display presentation of the returns from the downhole instrument. First, the means for generating the signals downhole to indicate the angular position of the tool may be modified as shown in FIG. 4 When potentiometers 15 and 18 are of the type shown in FIG. 2, erratic operation of the servo system may result when the movable contact crosses the dead spot in the potentiometer. Quite often the inertia is sufficient to carry the movable contact over the dead spot. However, if the movable contact 17 of potentiometer 18 stops between the point 19 and the corresponding point at the other end of the potentiometer, the balancing amplifier 20 will always be in balance. Further rotation of the movable contact of the downhole potentiometer 15 will not cause the uphole amplifier 20 to become unbalanced and, therefore, the movable contact 17 will not be moved off the dead spot to follow the movement of the movable contact of the downhole potentiometer 15.

This disadvantage may be overcome by replacing the downhole potentiometer 15 with a continuously wound potentiometer 101 as is shown in FIG. 4. Similarly, the uphole potentiometer 18, FIG. 2, may be replaced with the continuously wound potentiometer 102, shown in FIG. 4. There are no dead spots on the continuously wound potentiometers 101 and 102 and the system will continue to operate regardless of where the movable contact stops. The voltage on the movable contact of potentiometer 101 is applied over line 103 to the uphole potentiometer 102. In FIG. 4, the slowly varying DC voltage from the movable contact of the downhole potentiometer is applied as one input to the balancing amplifier 104. The other input to balancing amplifier 104 is the voltage on the movable contact of the uphole potentiometer 102. The output of amplifier 104 drives the motor 105 in a direction which moves the movable contact of potentiometer 102 in a direction to balance the voltage inputs to amplifier 104.

The voltage on the movable contact of the downhole potentiometer 101 changes in the manner shown in FIG. 4a as the downhole transmitter and, hence, the movable contact of potentiometer 101 is rotated angularly in the borehole. As the movable contact of potentiometer 101 rotates in a clockwise direction, the voltage of FIG. 4a is at ground when the movable contact is at the point 101a, increases to a positive maximum when the movable contact is at the point 101b, is at ground again when the movable contact is at the point 101c, and decreases to a negative maximum when the movable contact is at the point 101d.

The arrangement of potentiometers shown in FIG. 4 has the disadvantage that when the movable contact passes the point 101b, for example, there is a tendency for the movable contact of the uphole potentiometer 102 to change directions. That is, after the voltage on the movable contact of the potentiometer 101 reaches the point b and starts to decrease so that the voltage on the movable contact reaches the voltage e, the uphole servo system may tend to balance the system just as it would if the movable contact were at the position producing the voltage at point f. Since the voltages at points e and f are the same, the uphole servo system has no way of distinguishing between them and may reverse the direction of rotation of the movable contact of potentiometer 102.

This disadvantage can be eliminated by using the potentiometers of the type shown in FIG. 5. In FIG. 5, the downhole potentiometer is of the type having two movable contacts. Such a potentiometer is indicated at 106 in FIG. 5. Similarly, an uphole potentiometer 107, having two movable contacts, is provided. The potentiometers 106 and 107 are of the type in which the two movable contacts rotate concurrently. The advantage of a system using such potentiometers is that when one movable contact is on a dead spot, the other contact is not on a dead spot and continues to drive the servo system.

The movable contact 106a is electrically connected to amplifier 108 which drives motor 109 to balance the movable contact 107a. Similarly, the contact 106b is electrically connected to amplifier 110 which drives motor 111 to position movable contact 107b.

In operation, the motor 109 tends to drive movable contact 107a to the same position as that assumed by movable contact 106a. Similarly, the motor 111 tends to drive movable contact 107b to the same position as that assumed by movable contact 106b. The outputs of both motors are mechanically linked together and drive the movable contacts 107a and 107b concurrently. At the same time, they drive the movable contacts of the sine-cosine potentiometer 112 which corresponds with the sine-cosine potentiometer 24 in FIG. 2.

The system shown in FIG. 5 does not have the disadvantage of the system shown in FIG. 2 in that when one of the movablec ontacts is on a dead spot, the other movablec ontact will continue to drive the system. The system of FIG. 5 does not have the disadvantage of the system shown in FIG. 4 in that there is no ambiguous position on the potentiometer at which the system may erroneously change direction of rotation.

There will now be described a modification of the presentation of the display of information to provide a more useful, easily interpreted display. In describing the system of FIG. 2, it was assumed that a picture was taken of the face of the plan position indicator 26 when there had been completed one rotation of the assembly including transmitter 11 and receiver 12 around the borehole at a particulard epth. A picture of the PPI scope when one such revolution had been completed would appear as in FIG. 2g indicating the shape of the borehole at a particular depth, together with the position of an anomaly, such as 30, which occurred at that depth. A more useful presentation of information can be obtained if successive traces are recorded on the picture at differing successive depths and, further, if each successive trace has a different diameter. Thus, there can be obtained a picture of the borehole having the three-dimensional effect shown in FIG. 6. In FIG. 6, the trace 29 of FIG. 2g may be the outermost trace. When the logging tool is lowered an incremental amount, a second trace 113 is produced. Similarly, the logging tool is lowered another increment and the trace 114 is recorded at that depth. Similarly, the tool is lowered further increments and the traces 115, 116, 117 and 118 are produced. (As will be apparent from the following description, the logging can be performed equally well while the tool is being continuously raisd in the borehole, and most frequently logging will be performed in this manner. Under this condition, traces 29 and 113–118 will become a continuous spiral.) The net effect of these multiple traces is to produce a three-dimensional effect on a photograph from which the shape of the borehole can be determined and, further, from which the extent and position of a fault in the borehole can be determined. Photographs similar to FIG. 6, and having a great many more traces than that shown in FIG. 6, have a three-dimensional effect which is approximately the same as that obtained from looking directly down the borehole. In FIG. 6, it is quite easy to trace the path of a fault in the borehole as indicated by the discontinuities 119 in the traces.

Photographs similar to that shown in FIG. 6 can readily be obtained with a slight modification of the system of FIG. 2. There is shown in FIG. 2 a delay generator 32, the function of which has not been described previously. The function of the delay generator 32 is to delay the sync pulse by different incremental amounts for different depths of the borehole, so that the diameter of the traces 29, 113, 114, . . . 118 will be different for different depths.

It will be appreciated that the diameter of the trace is determined by the time interval between the initiation of the sweep, which occurs when delay generator 32 produces an output, and the arrival of the reflected pulse at the receiver 12. The sweep which produced trace 29 was initiated coincidentally with the transmitter pulse T shown in FIG. 6a. Therefore, the diameter of the trace 29 is determined by the time interval between the transmitter pulse T and the arrival of the receiver pulse R at all points around the periphery of the borehole. Now, if the initiation of the sweep is delayed from the transmitter pulse and is initiated by the pulse S shown in FIG. 6e, the diameter of the resulting trace will be decreased. This results from the fact that the time interval between the pulse S and the receiver pulse R is always less than the interval between the transmitter pulse T and the receiver pulse R.

Therefore, if the sync pulse S can be delayed by successively increasing increments, the diameters of the resulting traces 113–118 will be successively smaller. The delay of the sync pulse S for successively greater intervals is the function of delay generator 32.

The circuitry making up the delay generator 32 is shown in more detail in FIG. 7. The output of the sync pulse generator 11a in FIG. 2, corresponding with the transmitter pulse T in FIG. 6a, fires the sync multivibrator 120. The sync multivibrator 120 produces the waveform shown in FIG. 6b. This multivibrator 120 triggers a delay multivibrator 121 thereby producing the waveform shown in FIG. 6c. The short gate of the multivibrator 121 is applied through buffer amplifier 122 to the delay sweep generator 123 which generates a linear ramp voltage which begins with the leading edge of the output of delay multivibrator 121 and terminates with the trailing edge of that gate. The output of the delay sweep generator 123 is applied to the anode of the diode 124. To the cathode of diode 124 there is applied a voltage proportional to the depth of the logging tool. A potentiometer 125 develops a voltage proportional to the depth of the logging tool. As the depth of the logging tool is changed, the movable contact of potentiometer 125 is moved. Thus, there is developed across capacitor 126 a voltage proportional to the depth. The voltage on capacitor 126 determines the voltage at which the diode 124 will become conductive. For example, assume that the voltage across capacitor 126 is +5 volts. The diode 124 will not conduct until the output of delay sweep generator 123 exceeds 5 volts, the waveform being shown in FIG. 6d. When this occurs, the diode 124 conducts a positive voltage which triggers the pulse amplifier 127 to produce the pulse S of FIG. 6e. The time of occurrence of this pulse varies in accordance with the voltage on capacitor 126. As a further example, assume that the voltage on capactor 126 is +7 volts. Then, the diode 124 will not conduct until the output of delay sweep generator 123 exceeds +7 volts, the waveform being shown in FIG. 6d. This occurs at a later time than when the voltage on the capacitor 126 was only +5 volts. Therefore, the pulse S is delayed by increasing increments of time by increasing the voltage on capacitor 126. As the depth of the logging tool is increased, the voltage across capacitor 126 is increased thereby delaying the initiation of the sweep of the plan position indicator. This produces traces of ever decreasing concentric diameters such as are shown in FIG. 6. In this way, there has been produced a three-dimensional representation of the inside diameter of the borehole.

A different presentation of information, which will disclose the path of a fault quite well but which will not indicate the diameter of the borehole, is shown in FIG. 8. In FIG. 8, each of the traces 131–139 represents a different depth of the borehole. Angular position around the periphery of the borehole is indicated by increasing distance to the right. The relation of FIG. 8 to the borehole can be better understood if the paper were to be formed into a cylinder so that point 131b touches point 131a and the extreme right-hand points of the other traces touch the extreme left-hand points of the traces. The cylinder then represents the borehole. The presentation of FIG. 8 is similar to a developed view of the inside of the borehole at different depths.

The presentation of FIG. 8 can be obtained with the equipment shown in FIG. 2 with slight modifications thereof. In FIG. 2, it was assumed that the logging tool remained at one depth in the borehole while a complete rotation of the tool was made. Then, the depth of the logging tool was changed for another complete rotation of the logging tool in the borehole. Normally, the depth of the logging tool will not be changed in increments but will be continuously changed while the tool is being rotated. This slight modification of the operation of the equipment can be understood with reference to the equipment which produces the traces of FIG. 8.

The modifications of FIG. 2 which will produce the display of FIG. 8 will now be described. The voltage on the lead 16a from the movable contact of the downhole potentiometer 15 is applied directly to the horizontal deflection plates of an oscilloscope. The voltage on the lead 16a will be a sawtooth waveform as is shown in FIG. 8a. The voltage in FIG. 8a rises to a positive maximum then falls rapidly to zero; rises to a positive maximum again then falls rapidly to zero. The linear rise to a positive maximum will sweep the beam of the oscilloscope across the face of the tube to produce a trace such as the trace 131. The receiver 12 turns on the trace each time it receives an echo. As long as the receiver 12 is receiving echoes, the trace 131 across the face of the oscilloscope will be solid. However, when the transmitter rotates to an angular position at which there is a fault, there will be no return and there will be resulting discontinuities in the traces as at 131c.

As the cathode ray beam is swept across the oscilloscope, the vertical deflection voltage is continuously changed in correlation with the depth of the logging tool in the borehole. Since the logging tool will commonly be continuously moved vertically through the borehole, the vertical deflection voltage is constantly changing and the traces of FIG. 8 are inclined slightly indicating this continuous change of depth of the logging tool.

Instead of continuously changing the vertical deflection voltage on the oscilloscope, another manner of accomplishing the relative movement between the trace and the film is to continuously change the position of the film which is used to record the oscilloscope display. As is better shown in FIG. 12, the oscilloscope film is driven past the face of the oscilloscope in correlation with change of depth of the logging tool thereby producing a display on the film which is similar to that shown in FIG. 8.

As a further modification of a type of presentation, consider a presentation which will be similar to FIG. 8 in that the inside of the borehole is represented as a folded-out flat sheet but which, in addition to indicating faults, also indicates the diameter of the borehole at all angular positions.

The system shown in FIG. 9 provides such a presentation. The voltage from the movable contact of the downhole potentiometer 15, FIG. 2, is again applied to the horizontal deflection plates of an oscilloscope which is shown at 140.

In FIG. 9a, there is shown the transmitter pulses T and the receiver pulses R. It will be appreciated that the voltage from the downhole potentiometer, which voltage is shown in FIG. 9b, increases linearly and very slowly with respect to the repetition rate of the transmitter pulse. For example, complete rotation of the transmitter tool may take place in one second. This is quite a long time compared to the 1000-microsecond spacing of the transmitter pulses.

The transimtter pulse from sync generator 11a triggers the syn multivibrator 140a which triggers the delay multivibrator 141, thereby producing the waveform shown in FIG. 9c. This delay multivibrator 141 returns to its stable state at the time 142 which is selected to occur just prior to the expected arrival of the receiver pulse R. When the multivibrator 141 returns to its stable condition, it triggers multivibrator 143, the output of which is shown in FIG. 9d. This multivibrator 143 remains in its unstable condition for a time which should encompass the expected arrival of the receiver pulse R. The output of multivibrator 143, which output is shown in FIG. 9d, is applied to sweep generator 144 which produces the waveform shown in FIG. 9e. The total voltage excursion of the sweep voltage of FIG. 9e is a small increment of the total sweep voltage of the downhole potentiometer, as shown in FIG. 9b. For example, if the voltage from the downhole potentiometer increases from 0 to 10 volts, then the output of the sweep generator 144 might increase from 0 to 1 volt each time that it is triggered. The voltage from sweep generator, which voltage is shown in FIG. 9e, is added to the voltage of FIG. 9b from the downhole potentiometer. The voltage of FIG. 9e is applied through resistor 145 and the voltage from the downhole potentiometer is applied through the resistor 145a to the common junction point of these two resistors. The common junction point is connected to the vertical deflection plates of the oscilloscope 140.

Again, the electron beam of the oscilloscope 140 produces a bright spot on the face of the oscilloscope each time a receiver pulse R is received. The result will be a series of horizontal traces for different borehole depths. Each trace has vertical deviations from its mean vertical position indicative of the borehole diameter at different angular positions in the borehole. Each trace also has breaks representng anomalies, or faults, in the borehole.

The resultant display may be of the type shown in FIG. 9f. This shows traces 146–150, each of which is indicative of the borehole configuration and anomalies at different depths. For example, the trace 146 deviates from its mean vertical position as indicated by the straight line 146a in accordance with the deviation of the borehole diameter from a mean diameter. When no reflected pulses are received, there are produced breaks in the traces indicative of borehole anomalies, as at 151.

A display of the type shown in FIG. 9f could be obtained with continuous movement of the logging tool vertically through the borehole as was explained in conjunction with FIGS. 7 and 8. However, the type of display particularly shown in FIG. 9f is obtained with incremental movement of the logging tool through the borehole. That is, the logging tool is stationary at a particular depth while the transmitter-receiver assembly is rotated one complete revolution and one trace is produced on the oscilloscope. Then the logging tool is incrementally moved to a new depth in the borehole and the process is repeated. It will be understood that for each trace an increment of voltage will be placed on the vertical deflection plates of the oscilloscope to move the cathode ray beam trace a vertical incremental distance. Or, the film which records the display is moved an incremental vertical distance for each increment of movement of the logging tool.

In the development of an oil field, the pattern and spacing of the wells drilled will, in the main, be governed by the direction taken by a fault, or fracture, through the formation being produced. Therefore, it is essential that knowledge is had not only of the existence of an anomaly, in this case a fracture, but also of the direction taken by the fracture. To this end, there is shown in FIG. 10 an arrangement for producing a signal useful in determining the orientation of the tool and ultimately the direction of any fracture. In the specific embodiment shown, a Hall effect device 200 is located in the downhole tool and rotated by motor 14 by way of a shaft 201. The Hall effect device 200, excited by a 10 kc. oscillator 202, produces a signal whose amplitude varies in accordance with magnetic field strength in the borehole. This field is the earth's magnetic field. The output of the Hall effect device, amplified by amplifier 203, has an appearance similar to that illustrated as the waveform in FIG. 11a.

This waveform is applied to a phase detector 204 whose output is integrated by the integrator 205 including resistor 206 and capacitor 207. The output of the integrator 205 is shown in FIG. 11b. The purpose of the integrator is to remove the 10-kilocycle signal and to convert the envelope illustrated in FIG. 11a to a sinusoid. The integrated signals are applied to a differentiator 208 including capacitor 208a and resistor 208b. The signal is then successively applied to an emitter follower 209, which is provided for impedance matching purposes, and to a discriminator and pulse-shaping unit 210. The unit 210 includes a tunnel diode discriminator. The pulse-shaping is performed by a differentiator and an amplifier. The function of the unit 210 is to produce a negative-going pulse, shown in FIG. 11c, each time the waveform in FIG. 11b goes through zero in a postive direction. Each time the negative-going pulse is produced, a one-shot multivibrator 211 responds to generate a pulse, FIG. 11d, of about 50 microseconds duration. This pulse is applied uphole over a cable conductor.

In FIG. 10, the sync pulse generator 11a and receiver amplifier 12a have been shown with the downhole equipment as will normally be the case.

Suitable uphole systems are illustrated in FIG. 12 and include elements which will apply to the face of the oscilloscope 26 a mark representative of magnetic north. It is well to recognize at this point that the Hall effect device and associated circuitry have produced a signal each time the Hall effect device is oriented in a westerly direction. Since it is desired to record a signal when the transmitter and receiver are faced toward magnetic north, it is necessary to rotate or otherwise shift the angular relationship between the transmitter-receiver and the Hall effect device so that they are displaced by 90°. Accordingly, when the transmitter-receiver is oriented toward magnetic north, the Hall effect device will be oriented toward the west.

Figure 11D:
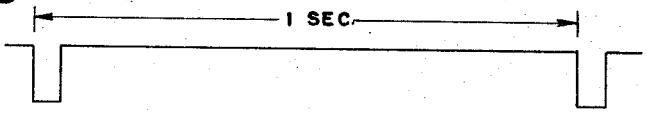
Figure 11E:
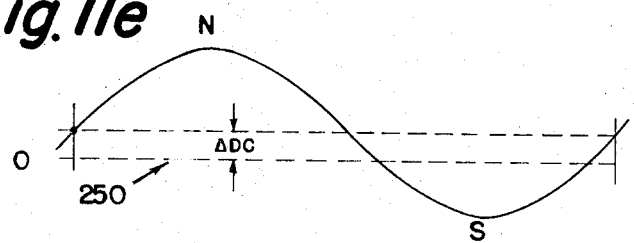
Figure 12:
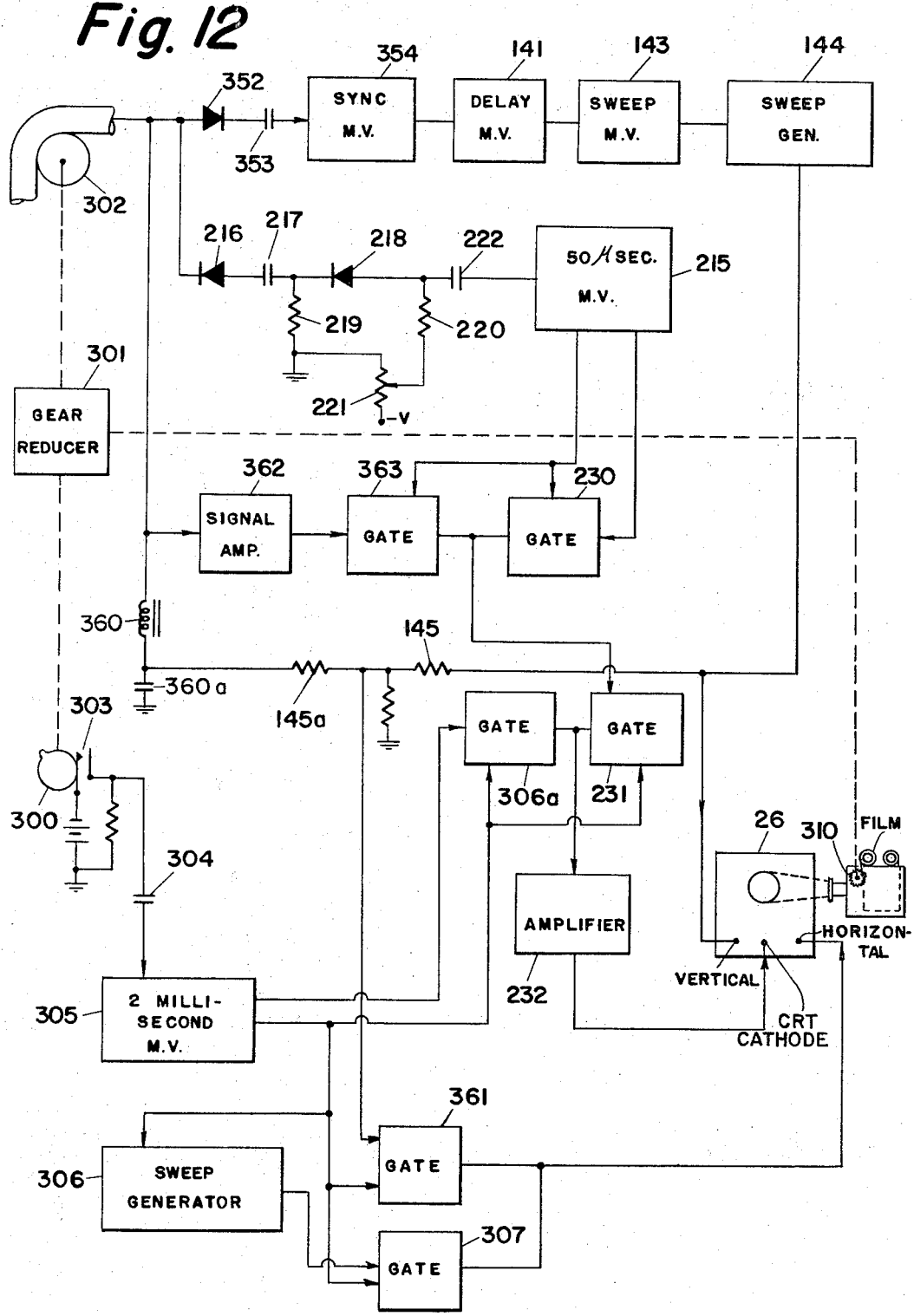

The negative-going pulse, waveform of FIG. 11d, arrives uphole by way of the cable conductor. The gating pulse is applied to multivibrator 215 by way of a network which includes a rectifier 216 which passes only negative-going signals and the capacitor 217 which blocks any DC signal components.

A rectifier 218 is provided in a network including resistors 219, 220 and a potentiometer 221 in order to pass only negative signals whose amplitude exceeds a predetermined level. This excludes any negative excursions of the receiver signal from being effective to trigger the 50-microsecond multivibrator 215. The capacitor 222 blocks the DC voltage which is supplied from the source labeled —V. Output gating pulses from the multivibrator 215 are now effective to close gate 363 and to open gate 230 to pass a gating pulse from the multivibrator 215 through the gate 230 and through normally open gate 231 to the amplifier 232. The output of the amplifier 232 is applied to the scope to place a high intensity marker on the face of the oscilloscope whose position along the trace indicates the magnetic north orientation of the transmitter-receiver.

The differentiating network 208, FIG. 10, which was not previously discussed, is provided to compensate for effects of temperature change on the output of the Hall effect device 200. In the absence of a magnetic field, the output of the Hall effect device 200 (while spinning), amplifier 203, and phase detector 204 is a DC signal whose amplitude varies with temperature. The net effect when the Hall effect device is spinning in a magnetic field is to produce a signal of a waveform, FIG. 11e, wherein the voltage has been shifted an amount ΔDC. With the voltage shifted with respect to the zero line 250 (FIG. 11e), it will be immediately recognized that the zero crossing points of the voltage have been shifted. This introduces an error in the location of the compass direction west. This is the point where the voltage will cross the zero line when going in a positive direction. The differentiator 208, comprised of the capacitor 208a and resistor 208b, removes the DC component and restores the zero line to its normal position.

The components for the integrator 205 and the differentiator 208 may be selected from the following relationship:

Integrator $C_{207}R_{206}= 100 \ 1/10$ kc.
Differentiator $C_{208a}R_{208b}=10 \ 1/$r.p.s.

wherein the capacitance and resistance of the components are respectively denoted C and R with subscripts denoting the reference numerals of the components; and wherein 10 kc. is the frequency of oscialtor 202 and r.p.s. is the rotations per second of the logging tool.

Each time the logging tool moves along the borehole a distance of ten feet, a marker is generated which takes the form of a very intense horizontal line across the face of the oscilloscope 26. This horizontal line is generated in the following manner. A cam 300 (FIG. 12) is mechanically coupled to the cable by way of a gear reducer 301 and sheave 302 such that the cam 300 makes one revolution for every ten feet of cable movement. Each rotation of the cam 300 causes switch 303 to close and applies a negative-going pulse by way of capacitor 304 to a 2-millisecond multivibrator 305. The output from the multivibrator 305 is effective to open gates 306a and 307 and to close gates 231 and 361. A second output from the multivibrator 305 passes by way of gate 306a through the amplifier 232 to intensity modulate the beam of the cathode ray oscilloscope 26.

The first output from the multivibrator 305 is also effective to trigger a sweep generator 306 whose output is applied by way of open gate 307 to the horizontal plates of the oscilloscope 26. The net result is a very intensive horizontal line drawn across the face of the oscilloscope for every ten feet of movement of the downhole tool. Alternatively, the amplifier 232 can be adjusted to turn off the electron beam during this horizontal sweep so that each ten feet of movement of the tool is marked by the absence of a horizontal trace on the display.

It is desirable when making a record, particularly having the characteristic of that illustrated in FIG. 9f, that the lines 146–150 be displaced vertically one from the other. This can be accomplished a number of ways. The oscilloscope may be arranged such that the beam is effectively stepped in a vertical direction for each horizontal sweep, i.e., each complete rotation of the downhole potentiometer, and the traces recorded on a plate of film, for example, a plate of Polaroid type film. (Polaroid is the trademark for film of the Polaroid Corporation, Cambridge, Massachusetts.) On the other hand, the oscilloscope may be arranged such that each trace appears in the same horizontal location and the plate of film moved in controlled fashion across the face of the oscilloscope. In a preferred arrangement, a strip of movie film rather than individual plates of Polaroid film may be used. The oscilloscope is arranged to reproduce information along the some horizontal line and the film is continuously drawn across the face of the oscilloscope under the control of tool movement. For example, a film drive sprocket 310 (FIG. 12) is mechanically coupled to the gear reducer 301 to scale the movement of the film to the movement of the downhole tool as reflected by movement of the cable.

In the description of the FIG. 2 embodiment, individual conductors were illustrated for carrying downhole generated information to surface instrumentation. In actual practice, all of the downhole information is conducted to the surface over a single conductor. The outputs from the receiver 12, the sync pulse generator 11a, and the multivibrator 211 are all applied to a summing circuit and amplifier 350, as shown in FIG. 10. The output of potentiometer 15 is applied by way of choke 351 to the output of the summing circuit and the combined signals, which have an appearance somewhat similar to that illustrated in FIG. 11f, are applied uphole over a single conductor.

Part of the uphole signal discrimination system previously has been, described for utilization of the signal representing the output of the Hall effect device. The sync pulses, potentiometer output, and receiver signals are utilized in the following manner.

Figure 11F:
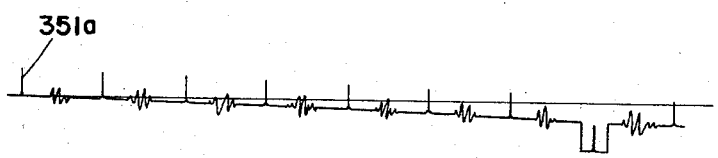

Referring again to FIG. 12, each time a sync pulse is generated by the sync pulse generator 11a, a positive-going pulse 351a, FIG. 11f, is applied by way of half-wave rectifier 352 and coupling capacitor 353 to trigger a sync multivibrator 354. The output of the sync multivibrator 354 is applied by way of delay multivibrator 141 to sweep multivibrator 143, which in turn is effective to trigger the sweep generator 144. The operation of delay multivibrator 141, sweep multivibrator 143 and sweep generator 144 is identical to that described in conjunction with like numbered components in FIG. 9. The output of the sweep generator 144 is applied to a summing circuit comprised of resistors 145 and 145a.

The output of the downhole potentiometer 15, a slowly varying DC voltage, increasing either negatively or positively, is applied to the other input of the summing circuit by way of a choke coil 360 which filters out the receiver signal. Gate 361 is normally open and, therefore, the output from the summing circuit is applied to the horizontal plates of the oscilloscope 26.

The receiver signal is applied to an uphole amplifier 362 and thence by way of normally open gates 363 and 231 and through the amplifier 232 to the CRT cathode circuit of the oscilloscope to intensity modulate the cathode ray beam. The receiver signal is effective only that the signal amplifier 362 for the following reasons. The sync multivibrator 354 responds to the sync pulse and has a period of unstability longer than the duration of the receiver signal; the multivibrator 215 has a response threshold greater than the amplitude of the receiver signal; and the network comprising choke 360 and capacitor 360a prevents the receiver signal from appearing at resistor 145a.

There will now be described in more detail the Hall effect device 200. Referring to FIG. 13, the Hall effect device 200 is mounted for rotation by the shaft 201 concurrently with the rotation of the transmitter-receiver assembly. Two flux concentrators 200a and 200b are positioned on either side of the Hall effect device 200 to concentrate the flux from the earth's magnetic field so that it passes through the Hall effect device 200. The output of the 10 kc. oscillator 202 is applied across the Hall effect device. A signal is developed across the output leads which are respectively coupled to ground potential and to the amplifier 203. As is well known, this signal varies in accordance with the magnetic field passing through the Hall effect device. Therefore, as the device is rotated through the earth's magnetic field, the output signal will vary in accordance with the angular position of the device with respect to magnetic north. Instead of utilizing a Hall effect device to indicate magnetic north, it is possible to use a gyro compass or a magnetic compass in conjunction with the circuitry of FIG. 10. For example, a photo-cell and a light source can be positioned to rotate about the statioinary compass needle concurrently with the rotation of the transmitter-receiver assembly. Each time the light beam intersects the stationary compass needle, which will always be pointing toward magnetic north, the photo-cell produces an output pulse indicating the magnetic north angular position of the transmitter-receiver assembly.

Another example of a device which may be used to respond to the earth's magnetic field to produce a signal indicative of geographic orientation of the logging tool is a flux gate magnetometer. One type of magnetometer which has particularly been found to be suitable for use with such a logging system is the Hewlett-Packard 3529A Magnetometer Probe. Such a magnetometer should be adapted for high temperature work in boreholes by replacing low melting point plastic material with high temperature material.

The unit 210 in FIG. 10 may be the type shown in FIG. 14 which includes what is commonly referred to as a tunnel diode 400. As is known, the tunnel diodes have a characteristic such that increasing current through the tunnel diode produces increasing voltage across the diode until a certain critical value of current is reached, above which increasing current causes a substantial step-like increase in voltage across the diode. The circuitry in FIG. 14 is such that the critical voltage is applied to the tunnel diode 400 when the output of the integrator 205, the waveform being shown in FIG. 11b, passes through zero in the positive direction. This voltage, taken from emitter follower 209, is applied through an emitter follower 401 and a resistor 402 to tunnel diode 400.

The voltage applied to the other side of the tunnel diode 400 is developed by means of potentiometer 403 and emitter follower 404. This voltage is adjusted by means of potentiometer 403 so that the tunnel diode will reach the critical point at the desired level of input voltage. The voltage at the emitter of emitter follower 404 is applied through diode 405 to the tunnel diode 400. When the input voltage from emitter follower 209 passes through zero in the positive direction, the tunnel diode 400 is biased to its critical point resulting in a sharp increase in voltage thereacross. The result is a positive-going pulse which is coupled through capacitor 406 to the amplifier 407. The output of amplifier 407 is a negative-going pulse which triggers multivibrator 211.

The gating circuitry which can be used for gates 230 and 363, gates 231 and 306a, and for gates 307 and 361 is shown in FIG. 15. This circuitry will be described as being used for the gates 230 and 363 but it will be appreciated that the same type circuitry can be used for the other gates. The receiver signal from signal amplifier 362 is applied through a resistor 408 to the base of transistor 409. Transistor 409 and transistor 410 are the principal components of gate 363. The output of multivibrator 215 is applied to the base of transistor 410. The output of multivibrator 215 is a 50-microsecond wide square pulse which renders transistor 410 conducting when it occurs. When transistor 410 is conducting, the receiver signal is effectively shunted to ground; i.e., the gate is blocked. Therefore, there is no signal to the output coupled to the amplifier 232.

The gate 230 similarly includes two transistors 412 and 413. The output of multivibrator 215 is applied to the bases of both of transistors 412 and 413. Normally, the transistor 412 is conducting. However, upon the occurrence of the 50-microsecond wide square pulse from multivibrator 215 the transistor 412 is cut off, the gate is unblocked, and the 50-microsecond wide square pulse passes through transistor 413, the emitter of which is coupled to the output.

Summarizing the operation of the gates, normally transistor 410 is cut off and the receiver signal passes through resistor 408, transistor 409 and transistor 411 to the output which is connected to the amplifier 232. Upon the occurrence of the 50-microsecond wide square pulse at the output of multivibrator 215, the transistor 410 is rendered conducting thereby shunting the receiver signal to ground. Simultaneously, transistor 412 is cut off thereby allowing the 50-microsecond wide square pulse to pass through transistor 413 to the output.

There has now been described the circuit details of the gates used in FIG. 12. It will be understood that the remainder of the circuitry represented by blocks in FIG. 12 is of conventional circuit design. Suitable amplifiers and multivibrators of a design well known to those skilled in the art can be used.

It should be pointed out that the oscilloscope 26 used in carrying out this invention is of a type readily available and normally used in displaying well logging information. However, it is desirable to make a slight change in the circuitry controlling the intensity of the cathode ray beam. In normal operation of most oscilloscopes, the beam is turned on with the beginning of each horizontal sweep so that the signal modulation may be viewed during the entire sweep of the electron beam. This is not desirable in the use of the oscilloscope with the present invention. Instead, it is desired to turn on the beam only when a signal is generated by the receiver, by the Hall effect device, or by the depth indicator. This means that the transmitter sync pulse must be gated out or otherwise rendered noneffective with respect to the beam control. The oscilloscope employed in the system is modified so that the internal sweep circuits respond to the transmitter sync pulse to condition the intensity control for response to the other aforementioned signals at a time soon after the appearance of the sync pulse. The delay is long enough to assure decay of the sync pulse and thus there is achieved an operation equivalent to gating.

While the acoustic logging tool of this invention has thus far been described in conjunction with determining faults and cracks in the borehole casing, it should be appreciated that the tool will have use in determining the positions of anomalies in the adjacent formations themselves. The only modification required to use the borehole for exploring adjacent formations is that the transmitter be adjusted to transmit pulses of a lower frequency. Also, a lower repetition frequency of the transmitted impulses must be used and the assembly must be rotated at a slower speed.

With these modifications, the logging tool is moved through the borehole and pulsed so that directional acoustic pulses are transmitted into the surrounding formations. The receiver 12 of FIG. 2 receives acoustic impulses reflected from interfaces in the adjacent formations. The received energy is displayed and/or recorded by the oscilloscope 26 and recording camera in a manner described previously in conjunction with the display and recording of the received pulses from the borehole casing. By studying this presentation, the location of anomalies beyond the borehole wall may be detected and the actual location, both in direction and distance from the borehole, may be determined. This method of using the acoustic logging tool may also be used in a borehole drilled in a salt dome to outline the boundaries of the salt dome. Also, the boundaries of a salt dome may be determined by drilling boreholes in the vicinity of salt domes and obtaining a survey by means of the acoustic logging tool to determine the outline.

In using the acoustic logging tool in this manner, it is important that the transmitting transducer emit sonic energy of a high enough frequency so that the energy is directional, but of a low enough frequency so that sufficient energy is contained therein for transmission through the formation for a considerable distance. A frequency which has been determined to be acceptable for use in this manner is $190 \times 10^3$ c.p.s. This frequency may be generated by a 5″ x ⅜″ piezo-electric disc. In employing the acoustic logging tool in this manner, it is necessary that the repetition rate of the pulses be low enough to permit the reception of reflected pulses from interfaces which are spaced large distances from the logging tool. This will also require that the assembly be rotated in the borehole at a slower speed so that sufficient acoustic impulses are transmitted into all portions of the adjacent formation to achieve the desired resolution.

Another possible use for the acoustic logging tool of this invention is in determining the dip of an interface through which the borehole passes. Where an interface between two formations of different charateceristics exists, it is desirable to know the slope or dip of this interface. For example, in FIG. 16, there is shown an interface 450 between two different formations 451 and 452. This interface is traversed by the borehole 453.

In using the acoustic logging tool to determine dip, it is desirable to apply the receiver signals to the oscilloscope in a manner which will produce the flat type of display of FIG. 8. In this type display each horizontal trace across the oscilloscope indicates the reflection characteristics at a particular depth. Such a display obtained while using the acoustic logging tool to determine dip is shown in FIG. 17. Assume that the formation 451 in FIG. 16 is a relatively porous medium which does not produce good reflections of the acoustic impulse, whereas the formation 452 does produce good reflections. Therefore, the cathode ray beam of oscilloscope 26 will register a visible line on the face of the oscilloscope only during that portion of the rotation of the assembly when the transmitter pulses are directed to the high reflectivity formation 452.

The horizontal trace produced when the tool is at the depth 454 will be visibly registered on the display only at the point 455. This point corresponds with the point 456 at the eastern portion of the borehole. This is the highest portion of formation 452 which is traversed by the borehole 453. At lower depths of the borehole, the sweeps across the oscilloscope face have increasing portions thereof registered as visible traces. Finally, at the depth 457 all of the trace will be registered across the face of the scope indicating that at this depth, the borehole is surrounded by the formation 452. The point 458 on the display of FIG. 17 indicates the point 459 in the borehole which is the lowest point of the formation 451 traversed by the borehole.

The maximum distance of dip of the formations through the borehole can be determined from the display shown in FIG. 17 by measuring the vertical distance between the points 455 and 458. Since there is a correlation between each of the horizontal traces on the oscilloscope and the depth of the logging tool in the borehole, this vertical distance can be easily determined. The dip of the interface in terms of degrees can be determined from the vertical distance and from the linear distance 460 across the borehole. The linear distance 460 can be obtained by standard borehole caliper means. Or the linear distance can be obtained by using the acoustic logging tool of this invention to determine borehole diameter.

An important aspect of dip determination by this technique is that the loggging tool should have a vertical orientation in the borehole. If the tool does not have a vertical orientation, the inclination of the tool with respect to a vertical orientation must be known so that the display can be corrected for inclination. For this purpose, an inclinometer may be included on a common mounting with the transmitter-receiver assembly as is shown in FIG. 18. Alternatively, inclination of the tool at any particular depth may be determined from an inclinometer survey which is commonly available for many wells.

Often it is not possible to obtain a clear delineation between two dipping formations which will produce a display of the type shown in FIG. 17. The dip may also be determined from a fracture or a thin bed which traverses the borehole in a dipping or sloping direction following the dip of adjacent formations. When the logging tool encountere such a feature, a display of the type shown in FIG. 17a will be produced. In FIG. 17a, the absence of echoes in the receiver signals causes an absence of registration of the electron beam on the display medium. This absence of registration outlines the anomaly 450a. This anomaly passes completely through the borehole at a sloping inclination to the borehole. The direction of dip of the anomaly is the orientation with respect to magnetic north of the minimum of the anomaly 450a. As shown in FIG. 17a, the direction of dip of the anomaly 450a is approximately 320° with respect to magnetic north. The dip of this feature is, of course, the ratio of the vertical distance between lines 455a and 458a to the borehole diameter at this depth.

Often, the borehole is not exactly circular; for example, it may be elliptical in shape. In such cases, the normal borehole caliper provides an average determination of borehole diameter which may be misleading in determining dip. In such instances it is desirable to determine borehole diameter by means of the acoustic logging tool of this invention as particularly described, for example, in conjunction with FIG. 2.

There will now be described a modification of the invention which has advantages over the embodiments previously described under certain circumstances. It has been found that when the sweep voltage generated by a downhole potentiometer is transmitted uphole over a particularly long logging cable, there is considerable noise pick-up on the signal. In particular, undesirable 60-cycle ripple on the sweep voltage may adversely affect the display on the oscilloscope. This problem is obviated, in accordance with an aspect of the present invention, by providing an uphole sweep generator which is triggered in response to a downhole signal indicator of orientation of the tool.

Often, the logging tool may twist on the cable which supports it in the borehole. When the horizontal sweep of the display is generated by the potentiometer, as in the FIG. 2 embodiment, the twisting of the tool on its cable will result in a displacement in geographic direction on the display. For example, in the display of FIG. 8, geographic north may be at the left hand edge of the display at the top. However, as the tool twists on its cable as it is lowered in the hole, geographic north may appear at the middle or towards the right of the display at the bottom thereof. This, of course, makes the display confusing and difficult to interpret. In accordance with one aspect of this invention, this difficulty is obviated by starting the sweep with the output from the Hall Effect device. In this manner, the sweep is always started when the tool is oriented in a particular geographic direction.

In the logging tools previously described, the receiver signal contains frequencies which may be on the order of 2 megacycles. It is quite difficult to intensity modulate the oscilloscope with this 2-megacycle signal. In accordance with another aspect of this invention, where conventional logging cable is employed, the 2-megacycle signal is detected in the logging tool and converted to a signal of lower frequency. This lower frequency signal is transmitted uphole and used to intensity modulate the oscilloscope. When coaxial cable is utilized, the detector may be positioned at the surface.

All of the foregoing aspects of the invention may be better understood with reference to the embodiment shown in FIGS. 18 and 19. FIGS. 18 and 19, respectively, show the downhole circuitry and the uphole circuitry for this embodiment of the invention. Where applicable, like reference numerals have been used to denote components which correspond to those previously described with reference to FIGS. 10 and 12.

As in previous embodiments, a transmitter of acoustic pulses 11 and a receiver of acoustic pulses 12 are mounted on a common shaft mechanically coupled to the motor 14 which rotates the transmitter-receiver assembly in the borehole. The functions of the transmitter 11 and receiver 12 may, of course, be performed by a single transceiver crystal which is capable of both transmitting acoustic pulses and receiving them. A sync pulse generator 11a periodically generates sync pulses which energizes transmitter 11 to transmit acoustic impulses into the surrounding borehole.

The Hall effect device 200 is also mechanically coupled to the transmitter and receiver as is indicated by the dashed lines 201 indicating mechanical coupling. The Hall effect device rotates with the transmitter and receiver in the borehole. It produces an output indicating the geographical orientation of the transmitter-receiver assembly in the borehole. The signal indicative of geographical orientation is obtained by using the Hall effect device 200 excited by a 10 kc. signal from the oscillator 202. The signal from the Hall effect device 200 is amplified in amplifier 203 the output of which is compared with the output from the oscillator 202 in phase detector 204. The output of phase detector 204 is integrated in integrator 205 which removes the 10 kc. carrier signal. The output of the integrator is applied to a differentiator 208 the output of which is applied to emitter follower 209. The output of emitter follower 209 is applied to the tunnel diode discriminator and amplifier 210, which, as previously described, produces a pulse each time the input waveform goes through zero in a positive direction. That is, the tunnel diode discriminator 210 produces a pulse output each time the Hall effect device 200 is oriented in a particular geographic direction, for example, west.

The output of discriminator 210 is applied to the one-shot multivibrator 211 which produces a 50-microsecond positive pulse. The positive pulse is coupled through capacitor 501 to the silicon controlled rectifier 502. The positive pulse causes silicon controlled rectifier 502 to conduct thereby discharging the capacitor 503. This causes current to flow in the primary winding 504 of a transformer. The secondary winding 505 of this transformer is connected across cable conductors 506, 506a. One of the conductors 506, 506a may be connected to the cable shield which is at ground potential. However, as shown, the DC voltage to supply power to the downhole circuitry is also applied to the conductors 506, 506a; therefore, both conductors are maintained above ground potential.

In addition to conducting the pulse output from the silicon controlled rectifier 502 uphole, the conductors 506, 506a are also used to convey the sync pulse and the receiver signal uphole. A positive pulse output from sync pulse generator 11a is applied to silicon controlled rectifier 507 which conducts, thereby discharging capacitor 508. This causes current to flow in the primary winding 509 of a second transformer. The secondary winding 510 of this transformer is connected across the conductors 506, 506a with a polarity such that a negative pulse is applied to the cable. The sync pulse applied to the conductors 506, 506a is inverted with respect to the pulse derived from the Hall effect device which is of greater magnitude than the sync pulse. This facilitates the separation of pulses uphole. In order to make the pulse derived from the Hall effect device of greater magnitude than that of the sync pulse, the capacitance of capacitor 503 is greater than that of capacitor 508.

As previously mentioned, the DC power is applied to the conductors 506, 506a. A lead has been shown at the center tap of transformer secondary winding 510 to connect this DC power to the downhole circuits. For simplicity of drawing, the connection of this DC power to the various downhole circuits has not been shown.

The receiver signal from receiver 12 may be sent directly uphole. However, as shown in FIG. 18, the receiver signal is detected and converted to a lower frequency which can better be used to intensity modulate the oscilloscope. In order to accomplish this the output of receiver 12 is applied through diode 511 which is poled so that only positive excursions of the receiver signal will be passed. These positive excursions are smoothed in the network including resistor 512 and capacitor 513 and are applied to an amplifier 514. The DC time constant of resistor 512 and capacitor 513 should approximate three times the period of the received signal. The output of amplifier 514 is coupled through capacitor 515 to the emitter follower transistor 516. The emitter follower transistor 516 produces the pulse which is applied to capacitor 517 and to the primary winding 518 of a transformer. The secondary winding 519 of this transformer is connected across the cable conductors 506, 506a so that the receiver pulse may be transmitted to the surface.

Briefly summarizing the operation of the downhole system, the Hall effect device 200 and associated circuitry produce a positive pulse, an orientation pulse, which is applied to the cable conductors 506, 506a each time that the transmitter-receiver assembly is oriented in a particular geographic direction. As the transmitter-receiver assembly continues its rotation through 360°, a plurality of acoustic pulses are transmitted by transmitter 11 toward the borehole wall. Sync pulses are produced coincidentally with each of these acoustic pulses and these sync pulses are transmitted uphole over conductors 506, 506a. Each of the acoustic pulses may be reflected from the borehole wall and received at receiver 12, in which case a receiver pulse is transmitted uphole over the conductors 506, 506a. However, if the orientation of the tool is such that the acoustic pulse strikes a fault or anomaly in the borehole, the acoustic pulse will not be reflected from the borehole wall and no receiver pulse will be produced.

The orientation pulse, the receiver pulses, and the sync pulses are utilized uphole to produce an oscilloscope display of the type shown in FIG. 20. The uphole circuitry for converting these signals to such a display is shown in FIG. 19. At the uphole location, each horizontal sweep of the beam across oscilloscope 26 is initiated by the orientation pulse derived from the Hall effect device.

In order to separate the orientation pulse from the receiver pulses and the sync pulses, a network including diode 216 and capacitor 217 is provided. Only the orientation pulse, made negative by the poling of the uphole coupling transformer, passes through diode 216. A network including diode 218, resistors 219 and 220, and potentiometer 221 is provided to pass only negative orientation pulses whose amplitude exceeds a predetermined level. This level is set by adjusting the potentiometer 221. A capacitor 222 is provided to block the DC voltage from the source labeled —V.

The orientation pulse which has an amplitude above the selected level is applied to sweep generator 520 by way of condenser 222 and inverting amplifier 222a. The sweep generator 520 generates a sawtooth voltage which is applied to the horizontal sweep of the oscilloscope 26 to scan the electron beam across the face of the oscilloscope. Sawtooth generator 520 includes a silicon controlled rectifier 521 which is turned on in response to the positive-going pulse output from amplifier 222a. When the silicon controlled rectifier 521 is turned on, the capacitor 522 discharges. This removes the potential from across silicon controlled rectifier 521 which becomes non-conducting. The capacitor 522 begins charging from the source of positive voltage through resistor 523. The resultant voltage across capacitor 522 increases toward a positive voltage at an approximately linear rate. This linearly increasing voltage is applied to the horizontal deflection plates of oscilloscope 26.

As the beam sweeps across the oscilloscope, it is turned on by the receiver signals in response to each received acoustic pulse. The receiver signals are amplified in the signal amplifier 362 and applied to the CRT cathode input of the oscilloscope.

In order to insure that the beam is turned on only by the receiver pulse, noise protection circuitry is provided. In addition to noise, there may be a crossfeed from the transmitter or sync pulse and circuitry must be provided to insure that the beam is not turned on by such a pulse. In order to do this, the sync pulse is used to condition the oscilloscope 26 for response to the receiver signals representative of reflections from surrounding formations. That is, the oscilloscope beam cannot be modulated until a time period after the reception of the sync pulse. The oscilloscope 26 is of the type in which a trigger may be applied to raise the beam to the threshold of response to an input signal. One oscilloscope suitable for this purpose is a Tektronix 535A. In the system of FIG. 19, the sync pulse is employed to generate the aforementioned trigger. More particularly, the sync pulse, made positive going by poling of the uphole coupling transformers, is applied through diode 352, which blocks all negative pulses, and through capacitor 353 to the sync multivibrator 354. A delay multivibrator 141 is triggered coincidentally with the sync multivibrator 354. When the delay multivibrator 141 returns to its stable condition, it generates the aforementioned trigger pulse which is applied to the scope trigger input so that the beam now may be turned on in response to a receiver signal. The sync multivibrator prevents the delay multivibrator from responding again to any spurious signals.

Vertical deflection of the beam on the oscilloscope face is performed in correlation with the vertical movement of the logging tool in the borehole. In order to accomplish this, a potentiometer 524 is provided. The contact of this potentiometer 524 is mechanically coupled through gear reducer 301 to the sheave 302 over which the logging cable passes. As the logging tool moves vertically in the borehole, the contact of potentiometer 524 moves across the resistance element thereby generating a slowly changing sweep voltage which is applied to the vertical deflection plates of oscilloscope 26.

The operation of the circuitry of FIG. 19 in producing a display of the type shown in FIG. 20 is as follows. Assume that the logging tool is moving upwardly in the borehole and that the transmitter-receiver assembly is continuously rotating. The Hall effect device 200 is displaced 90° with respect to the transmitter-receiver assembly. The first Hall effect device pulse is produced with the Hall effect device pointing west and with the transmitter-receiver assembly pointed north. This first pulse is applied to trigger sweep generator 520 which sweeps the beam of oscilloscope 26 across the face of the scope. As the transmitter-receiver assembly rotates throughout 360°, a plurality of acoustic pulses are transmitted toward the borehole wall. Coincidentally with each acoustic pulse, a sync pulse is produced which enables the scope trigger control. When the scope is in this condition, the occurrence of a receiver pulse will turn on the scope. Therefore a trace such as that indicated at 525 will be produced. Note that this trace is continuous except at discontinuities 525a and 525b which indicate portions of the borehole wall having a fault from which no acoustic pulses were reflected. The discontinuity 525a is the mirror image of discontinuity 525b indicating that the two discontinuities represent a single fault passing through the borehole. When the transmitter-receiver assembly is again oriented in a northerly direction, another trace 526 is produced. Note that the traces are continuously being deflected in an upward direction by the vertical deflection plates of the oscilloscope in correlation with the movement of the logging tool upwardly in the borehole. In this manner, there is produced a display indicative of a folded-out section of the inside of the borehole wall. The existence of a fault, such as at 525a, is established with respect to a particular geographic direction. In this case, geographic north corresponds with the left-hand side of the display.

It will be understood that certain of the desirable features of other embodiments of the invention may be incorporated with the system shown in FIGS. 19 and 20. The provision of circuitry to intensify, or to cut off, the beam at 10' intervals of depth in the borehole will be incorporated. This feature has previously been described with reference to switch 303, multivibrator 305, sweep generator 306, and associated gating circuitry in FIG. 12.

Also, under certain circumstances, it will be desirable to utilize a downhole potentiometer with the system of FIGS. 19 and 20. This downhole potentiometer, corresponding with potentiometer 15 in FIG. 2 for example, is mechanically coupled to the transmitter-receiver assembly so that its contact rotates with this assembly. The linearly changing voltage on the contact of the potentiometer may be transmitted uphole over the same conductors as are used for transmitting the other signals uphole. At the uphole location, this potentiometer signal may be used for a number of purposes. For example, it may be used to trigger the horizontal sweep of the oscilloscope in the event that the Hall effect device fails to produce an output to initiate the sweep.

Still another technique of initiating the horizontal sweep of the oscilloscope is available and may be used under certain conditions. This technique is to merely provide a downhole switch actuated by rotation of the motor driving the transmitter-receiver assembly. The motor will actuate the switch at a particular point in each rotation, thereby producing a pulse which may be applied to the sweep generator uphole to initiate the sweep.

Where the sweep is controlled by an uphole sweep generator, it is quite important to insure that the downhole transmitter-receiver assembly rotate at a constant speed. If the rotation is not constant, the registration of the features on the display will not correspond exactly with their geographic orientations in the borehole. In one mode of operation of the logging tool, the logging tool is rotated at one revolution per second while generating acoustic pulses at a 1 kc. rate.

In order to rotate the transmitter-receiver assembly accurately at the one revolution per second rate, it is desirable to provide a timing circuit to control the rate of revolution of the motor 14 (FIG. 2). The motor 14 is of the synchronous type which will, for example, rotate the transmitter-receiver assembly at a one revolution per second rate when a 60 cycles per second signal is applied to it by the timing circuit. Such a circuit is shown in the G.E. Transitor Manual, 7th edition, 1964, published by the General Electric Company, at page 338. On that page, the circuit marked B is suitable for generating a voltage at a 60 cycles per second rate which can be used to control the motor 14.

While the logging tool has been shown as including means for mechanically rotating the transmitter-receiver assembly, other expedients are available for providing rotation of the beam of energy in the borehole. For example, it is possible to provide a plurality of transducers spaced around the circumference of the logging tool such that they can be sequentially energized to provide rotation of the beam of energy around the borehole.

Referring now to FIGS. 21 and 22, there is shown an automatic gain control circuit for the acoustic logging system. It is desirable to use such an automatic gain control system when cracks or faults in the borehole wall or adjacent formation are being determined. In this case, the automatic gain control circuit can be set so that the oscilloscope beam is either turned full ON or turned OFF. That is, there are only two conditions of intensity. On the other hand, when the logging tool is being used to determine the lithology of the surrounding formation, the automatic gain control circuit will not be used since in that case it is desirable to produce a signal having an amplitude, or intensity, which represents the characteristics of the surrounding formation.

Referring now to the block diagram of FIG. 21, the sync pulses, corresponding in time with the generation of each acoustic pulse by the logging tool transmitter, are applied to sync multivibrator 527. When the sync multivibrator 527 is triggered, a delay multivibrator 528 is Triggered coincidentally. The sync multivibrator 527 and delay multivibrator 528 correspond in circuitry and in function with the sync multivibrator 354 and delay multivibrator 141 previously described in FIG. 19. When the delay multivibrator 528 returns to its stable condition, it triggers a gate generator multivibrator 529. This gate generator multivibrator 529 generates a gate which encompasses the expected time of arrival of the receiver signal input.

The receiver signal input is applied through signal amplifier 530 and diode detector 531 to the pulse amplifier 532. The receiver signal from pulse amplifier 532 is applied to the gate 533. The output of gate 533 is opened to pass the receiver signal by the output from gate generator multivibrator 529. The receiver signal passes through gate 533 and is applied to averaging circuit 534. Averaging circuit 534 integrates, or averages, the receiver signal over many cycles of operation of the acoustic transmitter to generate an AGC voltage which varies slowly with time. This AGC voltage is applied to the pulse amplifier 532 to control the gain thereof. Of course, the receiver signal output from gate 533 is applied to the CRT cathode for intensity modulating the oscilloscope beam as in previous embodiments.

The operation of the circuit of FIG. 21 is as follows. The circuit is provided in order to remove the intensity variations which occur along the vertical axis of a borehole as it is being logged with the well logging system. However, at the same time, the intensity variations which occur circumferentially around the borehole as it is being scanned are preserved. In order to do this, a long time constant, automatic gain control is provided in accordance with FIG. 21. The gate 533 and the three multivibrators 527-529 are provided to gate-out the crossfeed from the transmitter pulse and other noise before averaging the received signal. In order to average the receiver signal over a time which is long compared with the time of one revolution of the logging tool in the borehole, the receiver signal is applied through gate 533 to averaging circuit 534. This circuit develops an automatic gain control voltage which is applied to pulse amplifier 532 to control the gain thereof. If desired, the AGC voltage can also be applied to the 2-megacycle signal amplifier 530.

Referring now to FIG. 22, there is shown the circuit detail of the gate 533 and averaging circuit 534. The positive-going gating voltage from gate generator multivibrator 529 is applied to the base of transistor 535. This produces a negative-going gating voltage at the collector of transistor 535, and this negative-going voltage is applied to the base of gating transistor 536. The receiver signal from pulse amplifier 532 is applied through resistor 536a to the base of emitter follower 537. Gating transistor 536 is normally conducting so that the receiver signal is normally connected to ground through transistor 536. However, when the voltage applied to the base of transistor 536 goes negative, the transistor 536 is cut off and the receiver signal is no longer shunted to ground. Then the receiver signal is applied through emitter follower 537 to the peak-to-peak detector and averaging circuit 538. This circuit is provided to generate a voltage which is proportional to the peak value of the receiver signals and to average this voltage over the reception of a number of receiver signals.

In order to do this, the signal is applied through diode 539 to the integrating circuit including resistor 540 and capacitor 541. This integrating circuit averages the receiver signals over a number of cycles of operation and produces an AGC voltage. The voltage across the integrating circuit is applied to the emitter follower 542 which produces the AGC control voltage at the emitter thereof. In order to obtain the proper averaging to afford the best operation of the system, the time constant of resistor 540 and capacitor 541 should be set equal to the time period of approximately three revolutions of the logging tool in the borehole.

While particular embodiments of the invention have been shown and described, it will, of course, be understood that various changes may be made without departing from the principles of the invention. The appended claims are, therefore, intended to cover any such modifications within the true spirit and scope of the invention.

What is claimed is:

1. A borehole caliper system of the type including a transmitter and receiver of repetitive energy pulses included in an assembly adapted to be moved through a borehole and concurrently rotated about the borehole axis so that reflected pulses are indicative of the configuration and anomalies of said borehole comprising:
 a display device including deflection means to control the movement of an electron beam across a display medium and modulating means for causing said beam to register on said display medium in response to reflected pulses,
 means for generating a signal indicative of the rotational angle of said assembly,
 means for applying said signal indicative of the rotational angle of said assembly to said deflection means so that said electron beam moves across said display medium in accordance with the angular position of said assembly,
 means for applying electrical signals indicative of said reflected pulses to said modulating means so that said electron beam registers on said display medium an indication of the configuration and anomalies of said borehole, and
 means for changing the position on said display medium of the path of said electron beam with change in depth of said assembly in said borehole so that spaced concentric traces are registered on said display medium representing the configuration and anomalies of said borehole at different depths.

2. The method of calipering a borehole to determine the configurations and anomalies at different depths thereof comprising:
 continuously rotating in the borehole an assembly for transmiting and receiving acoustic impulses,
 generating from received acoustic impulses electrical signals representative of radial distances from said assembly to the wall of said borehole, the absence of said signals being indicative of the presence of an anomaly,
 generating beam-controlling voltages representaive of the rotational angle of said assembly in said borehole,
 moving under the control of said last-named voltages an electron beam along a path on a display medium, which path is representative of rotation of said assembly through 360°,
 generating a modulating voltage for said beam which turns said beam on in dependence upon said signals representative of the radial distances from said assembly to the wall of said borehole and which does not turn on said beam in the absence thereof due to an anomaly, and
 changing the position on said display medium of the path of said beam with change in depth of said assembly in said borehole so that a plurality of spaced concentric traces are registered on said display medium representing the configurations and anomalies of said borehole at particular depths.

3. The method of determining the characteristics of formations surrounding a borehole comprising:
 generating directional acoustic impulses at successive angular positions in said borehole and at changing depths in said borehole,
 receiving acoustic impulses reflected from successive angular positions in said formations,
 generating in response to said received acoustic impulses electrical signals representative of the characteristics of said formations at angular positions,
 generating voltages representative of the angular positions,
 moving under the control of said last-named voltages an electron beam along a path relative to a recording medium, which path is representative of a change of angular position of 360° in said borehole,
 applying a voltage representative of said electrical signals to said beam to intensity modulate said beam, and
 changing the position of the path of said electron beam with respect to said recording medium with change in depth in said borehole so that there is registered on said recording medium a representation of the characteristics of said formations at different depths.

4. The method recited in claim 3 wherein the step of generating directional acoustic impulses includes:
 energizing a transducer to emit acoustic energy having a frequency in a range having a lower limit determined such that the acoustic impulse is directional and having an upper limit such that the impulse can be received after travel from said transducer to the formation location having the characteristic to be determined and back to said transducer.

5. The method of determining the dip of the interface of two adjacent formations traversed by a borehole comprising:
continuously generating directional acoustic impulses at successive angular positions in said borehole and at changing depths in said borehole,
receiving acoustic impulses of one amplitude reflected from successive angular positions in one of said formations and receiving acoustic impulses of a different amplitude from the other of said formations,
generating in response to said received acoustic impulses electrical signals representative of the amplitude of said acoustic impulses at particular depths of said borehole,
generating voltages representative of said angular positions,
moving under the control of said last-named voltages an electron beam along a path on a recording medium, which path is representative of angular position through 360°,
generating a voltage for said beam which intensity modulates said beam in dependence upon said electrical signals to indicate by the registration of one intensity of said beam on said recording medium the presence of one formation and to indicate by registration of another intensity the presence of said other of said formations, and
changing the position of the path of said electron beam with respect to said recording medium with change in depth in said borehole.

6. A system for recording the characteristics of materials defining a borehole comprising:
a transmitter and receiver of repetitive acoustic energy pulses,
means for rotating said transmitter and receiver continuously about said borehole axis,
means for moving said transmitter and receiver through said borehole,
means for generating voltages representative of the rotational angle of said transmitter and receiver in said borehole,
means including an electron beam adapted for movement over a recording medium,
means under the control of said last-named voltages for moving said electron beam along a path on said recording medium which is representative of rotation of said transmitter and receiver through 360°,
means for applying a voltage representative of the energy pulses appearing at said receiver to said beam to intensity modulate said beam, and
means for changing the position of the path of said electron beam with respect to said recording medium in correlation with change in depth of said transmitter and receiver in said borehole so that there is registered on said recording medium a plurality of spaced lines of data representative of the characteristics of said materials along the length of the borehole.

7. The system recited in claim 6 and:
a device producing an output responsive to the magnetic field applied thereto,
means for mounting said device to said means for rotating said transmitter and receiver for rotating said device through the earth's magnetic field concurrently with the rotation of said transmitter and receiver in said borehole, and
means connected to the output of said device for indicating on said medium the geographical orientation of said transmitter and receiver.

8. The system recited in claim 7 wherein said device is a Hall effect device and further comprising:
flux concentrators positioned adjacent said Hall effect device for concentrating the earth's magnetic field through said Hall effect device.

9. The system recited in claim 6, and:
means responsive to the movement of said transmitter and receiver through said borehole for producing an output at increments of depth of said transmitter and receiver in said borehole, and
means responsive to said last-named output for marking said increments of depth on said recording medium.

10. The system recited in claim 6 further including:
a switch mechanically coupled to said means for moving said transmitter and receiver through said borehole.
said switch producing an output at given increments of depth of said transmitter and receiver in said borehole,
means responsive to said output for generating a sweep voltage,
means responsive to said output for applying said sweep voltage to said means for moving said electron beam along a path on said recording medium, and
means responsive to said output for intensity modulating said beam to indicate said increments of depth on said recording medium.

11. The system recited in claim 7 wherein said device producing an output responsive to the magnetic field applied thereto includes a flux gate magnetometer.

12. A well logging system comprising:
a logging tool to be moved along a borehole,
means in said tool for probing materials defining the borehole with a beam of high frequency acoustic energy,
means in said tool for mechanically rotating said beam of high frequency energy,
receiving means in said tool for receiving energy reflected from said materials,
means in said tool including means coupled to said rotating means for rotation in fixed relation with said beam and responsive to the earth's magnetic field to generate an electrical pulse each time said beam is rotated to a preselected geographic orientation and representative of the beginning of each rotation,
a utilization device for sequentially recording data representing the output of said receiving means through 360° of rotation of said beam in said borehole, and
means for applying said electrical pulse to said utilization device to indicate the initiation of each sequence of recording.

13. The system of claim 12 in which said utilization device includes a display medium and a cathode ray beam, and
means for changing the position of the path of said beam with respect to said display medium in correlation with change in depth of said receiving means in said borehole so that there is registered on said display medium a representation of the characteristics of said materials at different depths.

14. A well logging system comprising:
a transmitter and receiver of repetitive acoustic energy pulses,
means for mechanically rotating said transmitter and receiver about the borehole axis,
means including means mechanically coupled to said transmitter and receiver for rotation therewith and responsive to the earth's magnetic field to generate an electrical pulse when said transmitter and receiver are rotated to a particular geographic orientation,
means for generating a sweep voltage, said electrical pulse being applied to said last-named means to initiate the generation of said sweep voltage,
display means including a display medium and an electron beam for movement across said display medium,
means under control of said sweep voltage for moving said electron beam along a path on said display medium representative of rotation of said transmitter and receiver through 360°, and means for applying a voltage representative of received energy pulses to said beam to intensity modulate said beam.

15. The system recited in claim 14, and means for changing the position of the path of said beam with respect to said display medium in correlation with change in depth of said transmitter and receiver in said borehole so that there is registered on said display medium a representation of the characteristics of the formations surrounding said borehole at different depths.

16. A system for determining faults in a borehole comprising:

a transmitter and receiver of repetitive energy pulses, means for rotating said transmitter and receiver continuously about said borehole axis, means for moving said transmitter and receiver through said borehole, means for generating voltages representative of the rotational angle of said transmitter and receiver in said borehole, means including an electron beam adapted for movement over a display medium, means under the control of said last-named voltages for moving said electron beam along a path on said display medium which is representative of rotation of said transmitter and receiver through 360°, an averaging circuit connected to said receiver for producing an automatic gain control voltage representative of the amplitude of the output of said receiver over the time occurrence of a plurality of said repetitive energy pulses, an amplifier connected to said receiver for generating a voltage which turns said beam on in dependence upon the output of said receiver, and means for applying said automatic gain control voltage to said amplifier.

17. The system recited in claim 16, and means for changing the position of the path of said electron beam with respect to said display medium in correlation with change in depth of said transmitter and receiver in said borehole so that there is registered on said display medium a representation of the characteristics of the formations surrounding said borehole at different depths.

18. The system recited in claim 16 including:

gate control circuitry actuated in time correlation with said repetitive energy pulses, and a gate circuit, the output of said receiver being applied to said gate circuit, said gate control circuitry being connected to said gate circuit to open said gate circuit during the expected time of arrival of repetitive energy pulses at said receiver, the output of said gate circuit being applied to said averaging circuit so that said averaging circuit produces an output representative only of the amplitude of receiver signals.

19. A well logging system including a logging tool for determining anomalies of formations defining a borehole comprising:

means in the tool for repetitively probing said formations with pulses of high frequency acoustic energy, receiving means in the tool for receiving energy reflected from said formations, means in the tool for mechanically rotating said probing means and said receiving means, means in the tool for converting the output of said receiving means to electrical signals having a frequency lower than the high frequency energy and whose amplitude is representative of the presence or absence of anomalies, display means including an electron beam and a display medium, means for sweeping said beam horizontally across said display medium in correlation with rotation of said probing means in said borehole, means for intensity modulating said beam in accordance with said electrical signals, and means for vertically displacing the path of said beam with respect to the said display medium in correlation with change in depth of said transmitter and receiver in said borehole so that there is registered on said display medium a representation of the characteristics of said formation at different depths.

20. A well logging system for determining the configuration and anomalies of formations defining a borehole comprising:

means for repetitively probing said formations with pulses of high frequency energy, means for rotating said probing means, receiving means for receiving energy reflected from said formations, means for converting the output of said receiving means to electrical signals, the time relation between said electrical signals and each pulse of high frequency energy being indicative of the radial distance to the wall of said borehole, display means including an electron beam, means for sweeping said beam horizontally across said display means in correlation with rotation of said probing means in said borehole, means for intensity modulating said beam in accordance with said electrical signals, and means for displaying said beam vertically during each sweep in correlation with the time relation between said electrical signals and each pulse of high frequency energy.

21. A borehole caliper system of the type including a transmitter of repetitive energy pulses and a receiver of reflected energy pulses both included in an assembly adapted to be moved through a borehole and concurrently rotated about the borehole axis so that said reflected energy pulses are indicative of the configuration and anomalies of said borehole comprising:

a downhole potentiometer including a resistor having a voltage applied thereto and a movable contact actuated by said assembly so that said contact moves across said resistor as said assembly rotates in said borehole to generate a signal indicative of the rotational angle of said assembly, a single conductor connected to said movable contact for conducting an electrical signal indicative of the rotational angle of said assembly to an uphole location, a display device including electron beam deflection means to control the movement of an electron beam across a display medium and modulating means for causing said beam to register on said display medium only at selected times, means responsive to said signal indicative of rotational position for producing first and second voltages respectively varying as the sine and cosine of the rotational angle of said assembly, means synchronized with the repetitive transmission of said energy pulses for producing sync pulses, first and second sampling circuits responsive to said sync pulses for sampling said first and second voltages, means connected to the outputs of said sampling circuits for producing first and second sweep voltages which respectively rise linearly toward the voltages at the outputs of said sampling means, said first and said second sweep voltages being applied to said deflection means, means for applying said reflected energy pulses to said modulating means so that said electron beam registers on said display medium an indication of the configuration and anomalies of said borehole, and means for delaying said sync pulses by varying increments of time dependent upon the depth of said assembly in said borehole so that a plurality of traces are registered on said display medium to represent the configuration and anomalies of said borehole at different depths.

22. A well logging system as in claim 12 including means responsive to said electrical pulse applied to said utilization device to initiate the recording of each sequence as an indication of geographic orientation.

23. The system recited in claim 13 and means to convert signals representative of said received energy to signals of uniform amplitude to provide a constant intensity of modulation of the cathode ray beam.

24. In a system for investigating formations surrounding a borehole of the type including a transmitter and receiver of pulsed energy included in an assembly adapted to be moved through said borehole and concurrently rotated about the borehole axis so that reflected pulses are indicative of the configuration and anomalies of said formations, a system for indicating the rotational angle of said assembly about said borehole axis comprising:
 downhole means for generating a signal representative of a rotational angle of said assembly in said borehole,
 means for conducting said signal representative of said rotational angle to an uphole location,
 uphole circuitry for converting said signal to voltages for producing a PPI display,
 an uphole potentiometer having a movable contact,
 means responsive to said signal representative of the rotational angle for moving said movable contact in correlation with the rotation of said assembly,
 a potentiometer of the type having two movable contacts adapted for concurrent movement across a resistor having a resistance which varies sinusoidally along its length, said means for moving being coupled to said last-named two movable contacts so that one contact has a first voltage thereon proportional to the sine of the rotational angle of said assembly and the other contact has a second voltage thereon proportional to the cosine of the rotational angle of said assembly,
 an uphole display device, and
 means for applying signals representative of said reflected pulses and said first and second voltages to said display device to provide an indication of the configuration and anomalies of said formations.

25. In a system for investigating formations surrounding a borehole of the type including a transmitter and receiver of pulsed energy included in an assembly adapted to be moved through said borehole and concurrently rotated about the borehole axis so that reflected pulses are indicative of the configuration and anomalies of said formations, a system for producing a PPI presentation of formation conditions comprising:
 downhole means for generating a signal representative of a rotational angle of said assembly in said borehole,
 uphole means responsive to said signal representative of rotational angle for producing outputs representative of the angular position of said assembly, said uphole means including:
  a sweep generator of the type having two outputs, one output having a first voltage thereon proportional to the sine of the rotational angle of said assembly and the other output having a second voltage thereon proportional to the cosine of the rotational angle of said assembly,
 an uphole display device having horizontal and vertical deflection means, and
 circuitry for generating a vertical and a horizontal sweep voltage to be applied respectively to the vertical and horizontal deflection means of said display device including:
  first and second sampling circuits for periodically sampling said first and said second voltages,
  means connected to the outputs of said sampling circuits for producing first and second sweep voltages which respectively rise linearly toward the voltages at the outputs of said sampling means, and
  means for applying signals representative of said reflected pulses and said first and said second sweep voltages to said display device.

26. A well logging system comprising:
 a logging tool to be moved along a borehole,
 means in said tool for probing materials defining the borehole with a beam of high frequency acoustic energy,
 means in said tool for rotating said beam of high frequency energy,
 receiving means for receiving energy reflected from said materials,
 means in said tool including means coupled to said rotating means for rotation in fixed relation with said beam and responsive to a preselected rotational position of said beam to generate an electrical pulse representative of the beginning of each rotation of said beam,
 a utilization device including a visual recording medium for sequentially recording data representing the output of said receiving means through 360° of rotation of said beam in said borehole,
 means for applying said electrical pulse to said utilization device to indicate on the medium the rotational position of said beam during each sequence of recording, and
 means for spacing each sequence of recording on said medium one from the other as a function of depth of said receiving means.

27. The system recited in claim 26 wherein said means for generating an electrical pulse each time said beam is rotated to a preselected rotational position includes:
 a gyro compass,
 means for rotating in synchronism with said means for rotating said beam of high frequency energy and relative to said gyro compass, and
 a circuit producing an electrical pulse each time said last-named means is in a particular geographic rotational position.

28. The system recited in claim 26 wherein said means for generating an electrical pulse each time said beam is rotated to a preselected rotational position includes:
 a magnetometer,
 means for coupling said magnetometer to said means for rotating said beam, and
 a circuit for producing an electrical pulse each time said magnetometer is in a particular geographic rotational position.

29. The system recited in claim 26 wherein said means for generating an electrical pulse each time said beam is rotated to a preselected rotational position includes:
 an electric switch,
 means mechanically coupling said switch to said means for rotating said beam of high frequency energy to actuate said switch at a preselected rotational position, and
 a circuit producing an electrical pulse each time said switch is actuated.

30. The system recited in claim 26 wherein said receiving means includes:
 means for detecting and converting the received energy to a lower frequency.

31. A borehole logging system comprising:
 acoustic transducing means supported for rotation within a borehole and for movement along the length of the borehole to sense conditions of earth formations traversed by the borehole, means for mechanically rotating said transducing means,
means including means coupled to said rotating means for generating an electrical pulse each time said transducing means is rotated to a preselected geographic orientation,
a utilization device for sequentially recording signals representative of the output of said transducing means through 360° of rotation of said transducing means in the borehole,
said utilization device including a display medium and means for recording said signals as linear display lines extending in a first direction along said display medium,
means responsive to movement of said transducing means along the length of the borehole for registering said display lines in side-by-side relation in a direction substantially transverse to said first direction, and
means for applying said electrical pulse to said utilization device to initiate the recording of each display line.

32. A borehole logging system comprising:
transmitting and receiving means supported for rotation within a borehole and for movement along the length of the borehole to generate a beam of pulsed acoustic energy and to receive acoustic energy reflected from wall structure defining the borehole,
means for rotating said transmitting and receiving means continuously through 360°,
means coupled to said rotating means for generating an electrical pulse each time said transmitting and receiving means is rotated to a preselected geographic orientation,
a utilization device for sequentially recording signals representative of the received acoustic energy through 360° of rotation of said transmitting and receiving means in the borehole,
said utilization device including a cathode ray oscilloscope having a cathode ray beam and a continuous motion film device,
means responsive to said electrical pulse to initiate sweep of said cathode ray beam in a first direction along said continuous motion film device,
means responsive to movement of said transmitting and receiving means along the length of the borehole for moving the film of said motion film device as a function of depth to register on the film a plurality of sweeps of said cathode ray beam in side-by-side relation in a direction substantially transverse to said first direction, and
means responsive to said signals representative of received acoustic energy to modulate the intensity of said cathode ray beam.

33. A well logging system comprising:
means for generating high frequency energy to be directed toward materials defining a borehole,
receiving means for receiving energy reflected from said materials
means for mechanically rotating said receiving means,
means including means coupled to said rotating means and responsive to a preselected rotational position of said receiving means to generate an electrical pulse representative of the beginning of each rotation of said receiving means,
a utilization device including a visual recording medium for sequentially recording data representing the output of said receiving means through 360° of rotation of said receiving means in the borehole,
means for applying said electrical pulse to said utilization device to indicate on the medium the rotational position of said receiving means during each sequence of recording, and
means for spacing each sequence of recording on said medium one from the other as a function of depth of said receiving means.

34. A system for scanning tubular members comprising:
means for generating high frequency energy to be directed toward the inner surfaces of the tubular member,
receiving means for receiving energy reflected from said surfaces,
means for mechanically rotating said receiving means continuously through 360°,
means including means coupled to said rotating means and responsive to a preselected rotational position of said receiving means to generate an electrical pulse representative of the beginning of each rotation of said receiving means,
a ultilization device including a visual recording medium for sequentially recording data representing the output of said receiving means through 360° of rotation of said receiving means in the tubular member,
means for applying said electrical pulse to said utilization device to indicate on the medium the rotational position of said receiving means during each sequence of recording, and
means for spacing each sequence of recording on said medium one from the other as a function of the position of said receiving means along the tubular member.

35. A well logging system comprising:
means for generating high frequency energy to be directed toward materials defining a borehole,
receiving means for receiving energy reflected from said materials,
means for rotating said receiving means,
means for converting the output of said receiving means to electrical signals, the time relation between said electrical signals and the onset of said high frequency energy being indicative of the radial distance to the wall of the borehole,
display means including an electron beam,
means for sweeping said beam in a first direction across said display means in correlation with rotation of said receiving means,
means for intensity modulating said beam in accordance with said electrical signals, and
means for displacing said beam in a direction substantially transverse to said first direction during each sweep in correlation with the time relation between said electrical signals and the onset of said high frequency energy.

36. A well logging system as in claim 35 including:
means for displacing the path of said beam in said transverse direction in correlation with change in depth of said receiver in the borehole so that there is registered on said display means a representation of the characteristic of said materials at different depths in the borehole.

References Cited

UNITED STATES PATENTS

| | | | |
|---|---|---|---|
| 2,595,241 | 5/1952 | Goble | 181—.5 |
| 2,631,270 | 3/1953 | Goble | 340—18 X |
| 2,648,056 | 8/1953 | Jakosky | 340—18 |
| 2,825,044 | 2/1958 | Peterson | 340—18 |
| 2,921,465 | 1/1960 | Cook | 73—67.7 |
| 3,021,706 | 2/1962 | Cook et al. | 73—67.8 |
| 3,111,027 | 11/1963 | Moffatt et al. | 73—67.8 |
| 3,065,405 | 11/1962 | Jarrett | 340—18 XR |

FOREIGN PATENTS

| | | |
|---|---|---|
| 838,061 | 6/1960 | Great Britain. |
| 928,583 | 6/1963 | Great Britain. |

BENJAMIN A. BORCHELT, *Primary Examiner.*
R. M. SKOLNIK, *Assistant Examiner.*

UNITED STATES PATENT OFFICE
CERTIFICATE OF CORRECTION

Patent No. 3,369,626            February 20, 1968

Joseph Zemanek, Jr.

It is hereby certified that error appears in the above numbered patent requiring correction and that the said Letters Patent should read as corrected below.

Column 27, lines 11 and 12, for "amplitude" read -- amplitudes --; column 28, line 9, for "hole." read -- hole, --; column 30, line 10, for "formation" read -- formations --; line 30, for "displaying" read -- displacing --; column 33, line 59, for "materials" read -- materials, --.

Signed and sealed this 29th day of April 1969.

(SEAL)

Attest:

Edward M. Fletcher, Jr.            EDWARD J. BRENNER

Attesting Officer            Commissioner of Patents